(12) United States Patent
Liaw

(10) Patent No.: US 12,469,548 B2
(45) Date of Patent: Nov. 11, 2025

(54) SEMICONDUCTOR DEVICE

(71) Applicant: TAIWAN SEMICONDUCTOR MANUFACTURING COMPANY, LTD., Hsinchu (TW)

(72) Inventor: Jhon Jhy Liaw, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 257 days.

(21) Appl. No.: 18/165,678

(22) Filed: Feb. 7, 2023

(65) Prior Publication Data

US 2024/0105257 A1  Mar. 28, 2024

Related U.S. Application Data

(60) Provisional application No. 63/377,052, filed on Sep. 26, 2022.

(51) Int. Cl.
| | | |
|---|---|---|
| *G11C 11/412* | (2006.01) | |
| *G11C 11/417* | (2006.01) | |
| *H10B 10/00* | (2023.01) | |
| *H10D 89/10* | (2025.01) | |

(52) U.S. Cl.
CPC .......... *G11C 11/412* (2013.01); *G11C 11/417* (2013.01); *H10B 10/12* (2023.02); *H10D 89/10* (2025.01)

(58) Field of Classification Search
CPC ..... G11C 11/412; G11C 11/417; H10B 10/12; H10D 89/10
See application file for complete search history.

(56) References Cited

U.S. PATENT DOCUMENTS

| | | | |
|---|---|---|---|
| 7,471,548 B2 * | 12/2008 | Baiocco | H10B 10/12 365/72 |
| 8,625,334 B2 | 1/2014 | Liaw | |
| 8,879,305 B2 | 11/2014 | Liaw | |
| 9,613,953 B2 | 4/2017 | Liaw | |
| 9,793,273 B2 | 10/2017 | Liaw | |
| 9,805,985 B2 | 10/2017 | Liaw | |

(Continued)

OTHER PUBLICATIONS

U.S. Appl. No. 17/711,791, filed Apr. 1, 2022 (application as filed).

*Primary Examiner* — Joshua L Schwartz
*Assistant Examiner* — Joseph Fidelis Stormes
(74) *Attorney, Agent, or Firm* — Cooper Legal Group, LLC

(57) ABSTRACT

A semiconductor device includes first and second active areas, first and second gate structures, and first to third conductive segments. The first and second active areas extend along the first direction. The first and second gate structures cross over the first and second active areas. The first conductive segment crosses over the first and second gate structures, stores a first data signal, and is coupled to the first gate structure, the first and second active areas. The second conductive segment crosses over the first and second gate structures, stores a first complementary data signal, and is coupled to the second gate structure, the first and second active areas. The third conductive segment crosses over the first and second gate structures, and is coupled to the second active area. The first to third conductive segments are arranged in order along a second direction different from the first direction.

20 Claims, 32 Drawing Sheets

(56) References Cited

U.S. PATENT DOCUMENTS

| | | |
|---|---|---|
| 10,170,480 B2 | 1/2019 | Liaw |
| 11,024,632 B2 | 6/2021 | Liaw |
| 2019/0198507 A1* | 6/2019 | Nii ........................ G11C 11/412 |
| 2020/0343248 A1* | 10/2020 | Bossu ..................... H10B 10/12 |

* cited by examiner

SEMICONDUCTOR DEVICE

CROSS-REFERENCE TO RELATED APPLICATION

This application claims priority benefit of U.S. Provisional Application Ser. No. 63/377,052, filed Sep. 26, 2022, the full disclosures of which are incorporated herein by reference.

BACKGROUND

Static Random Access Memory (SRAM) is commonly used in integrated circuits. SRAM cells have the advantageous feature of being able to hold data without the need to refresh. With the increasingly demanding requirements on the speed of integrated circuits, the read speed and write speed of SRAM cells have also become more important. With increased down-scaling of the already very small SRAM cells, however, such requests are difficult to achieve.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
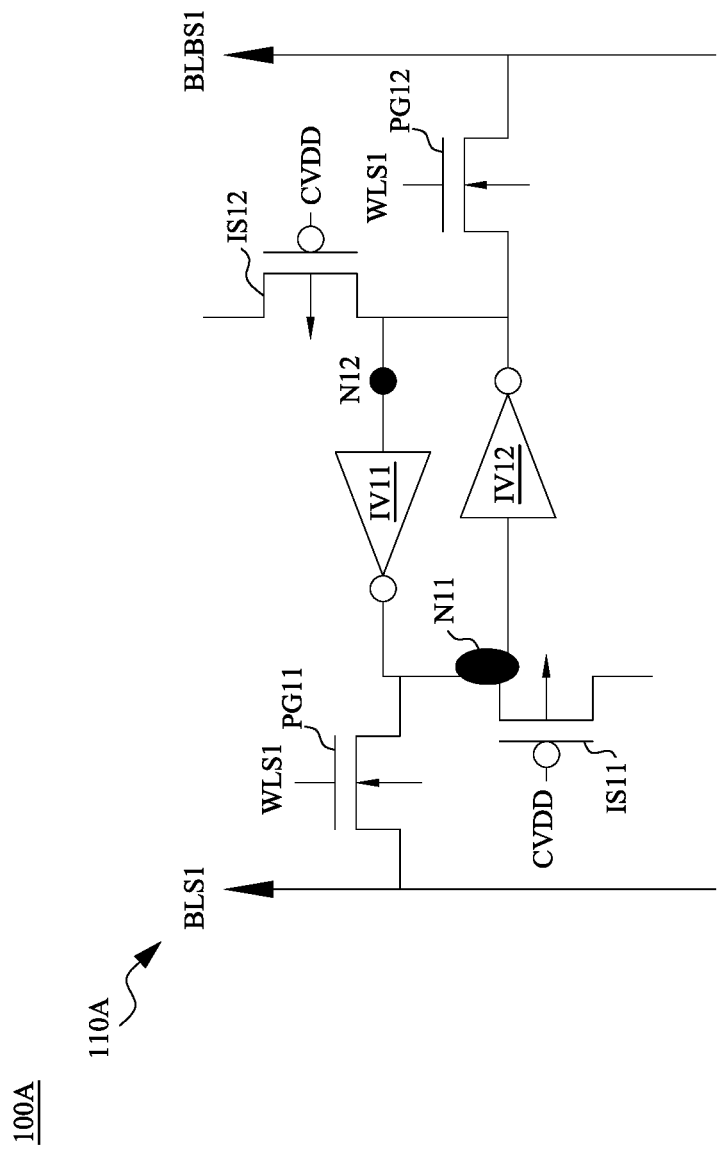
FIG. 1A is a circuit diagram of a semiconductor device, in accordance with some embodiments of the present disclosure.

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. The term mask, photolithographic mask, photomask and reticle are used to refer to the same item.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

FIG. 1A is a circuit diagram of a semiconductor device 100A, in accordance with some embodiments of the present disclosure. In some embodiments, the semiconductor device 100A is a memory device including multiple bit lines, word lines and memory cells.

As illustratively shown in FIG. 1A, the semiconductor device 100A includes a memory cell 110A. The memory cell 110A includes inverters IV11, IV12 and switches PG11, PG12, IS11, IS12. In some embodiments, the switches PG11 and PG12 are implemented by N-type metal-oxide semiconductor (NMOS) transistors, and the switches IS11 and IS12 are implemented by P-type metal-oxide semiconductor (PMOS) transistors.

As illustratively shown in FIG. 1A, a control terminal of the switch PG11 is configured to receive a word line signal WLS1, a first terminal of the switch PG11 is configured to receive a bit line signal BLS1, and a second terminal of the switch PG11 is coupled to a node N11. A control terminal of the switch PG12 is configured to receive the word line signal WLS1, a first terminal of the switch PG12 is configured to receive a bit line signal BLBS1, and a second terminal of the switch PG12 is coupled to a node N12.

As illustratively shown in FIG. 1A, a control terminal of the switch IS11 is configured to receive a reference voltage signal CVDD, and a first terminal of the switch IS11 is coupled to the node N11. A control terminal of the switch IS12 is configured to receive the reference voltage signal CVDD, and a first terminal of the switch IS12 is coupled to the node N12. An output terminal of the inverter IV11 is coupled to the node N11, and an input terminal of the inverter IV11 is coupled to the node N12. An output terminal of the inverter IV12 is coupled to the node N12, and an input terminal of the inverter IV12 is coupled to the node N11.

In some embodiments, the memory cell 110A is configured to store a data signal at the node N11, and configured to store a complementary data signal, which has a logic value complementary with a logic value of the data signal, at the node N12. The switch PG11 is configured to transmit the data signal according to the word line signal WLS1. The switch PG12 is configured to transmit the complementary data signal according to the word line signal WLS1.

In some embodiments, the switch IS11 is configured to be turned off according to the reference voltage signal CVDD, to isolate the memory cell 110A from an adjacent memory cell coupled to the switch IS11. The switch IS12 is configured to be turned off according to the reference voltage signal CVDD, to isolate the memory cell 110A from another adjacent memory cell coupled to the switch IS12.

Figure 1B:
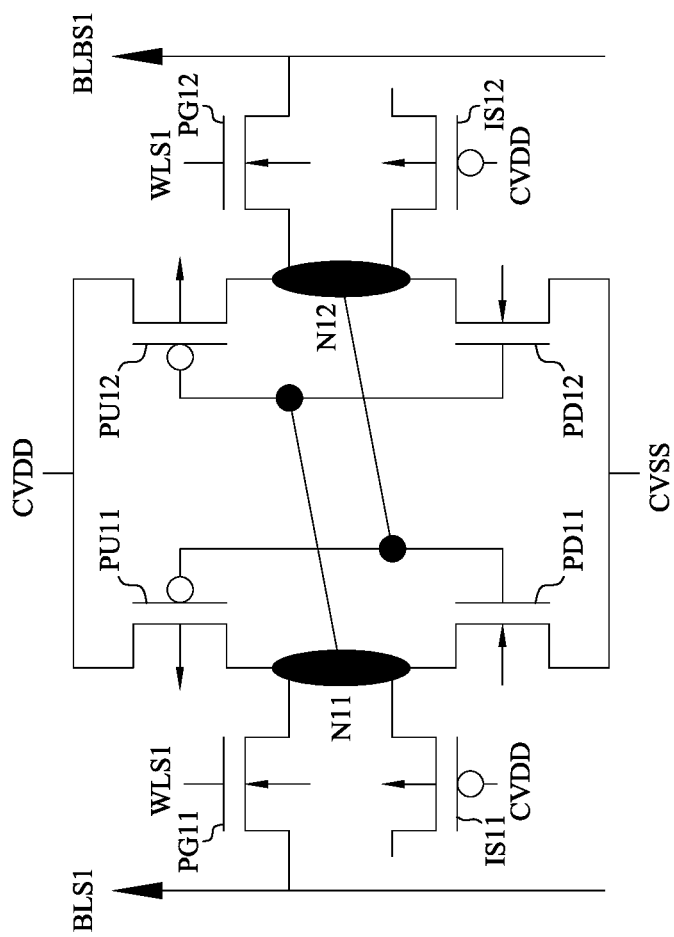
FIG. 1B is a circuit diagram of the memory cell of the semiconductor device shown in FIG. 1A, in accordance with some embodiments of the present disclosure.

FIG. 1B is a circuit diagram of the memory cell 110A of the semiconductor device 100A shown in FIG. 1A, in accordance with some embodiments of the present disclosure. FIG. 1B follows a similar labeling convention to that of FIG. 1A. For brevity, the discussion will focus more on differences between FIG. 1A and FIG. 1B than on similarities.

As illustratively shown in FIG. 1B, the memory cell 110A further includes switches PU11, PU12, PD11 and PD12. A first terminal of the switch PU11 is configured to receive the reference voltage terminal CVDD, a second terminal of the switch PU11 is coupled to the node N11, and a control terminal of the switch PU11 is coupled to the node N12. A first terminal of the switch PU12 is configured to receive the reference voltage terminal CVDD, a second terminal of the switch PU12 is coupled to the node N12, and a control terminal of the switch PU12 is coupled to the node N11. A first terminal of the switch PD11 is configured to receive a reference voltage terminal CVSS, a second terminal of the switch PD11 is coupled to the node N11, and a control terminal of the switch PD11 is coupled to the node N12. A first terminal of the switch PD12 is configured to receive the reference voltage terminal CVSS, a second terminal of the switch PD12 is coupled to the node N12, and a control terminal of the switch PD12 is coupled to the node N11.

Referring to FIG. 1A and FIG. 1B, the switches PU11 and PD11 correspond to the inverter IV11, and the switches PU12 and PD12 correspond to the inverter IV12. For example, the inverter IV11 includes the switches PU11 and PD11, and the inverter IV12 includes the switches PU12 and PD12. In some embodiments, the switches PU11 and PU12 are implemented by PMOS transistors, and the switches PD11 and PD12 are implemented by NMOS transistors. In some embodiments, a voltage level of the reference voltage signal CVDD is higher than a voltage level of the reference voltage signal CVSS.

Figure 1C:
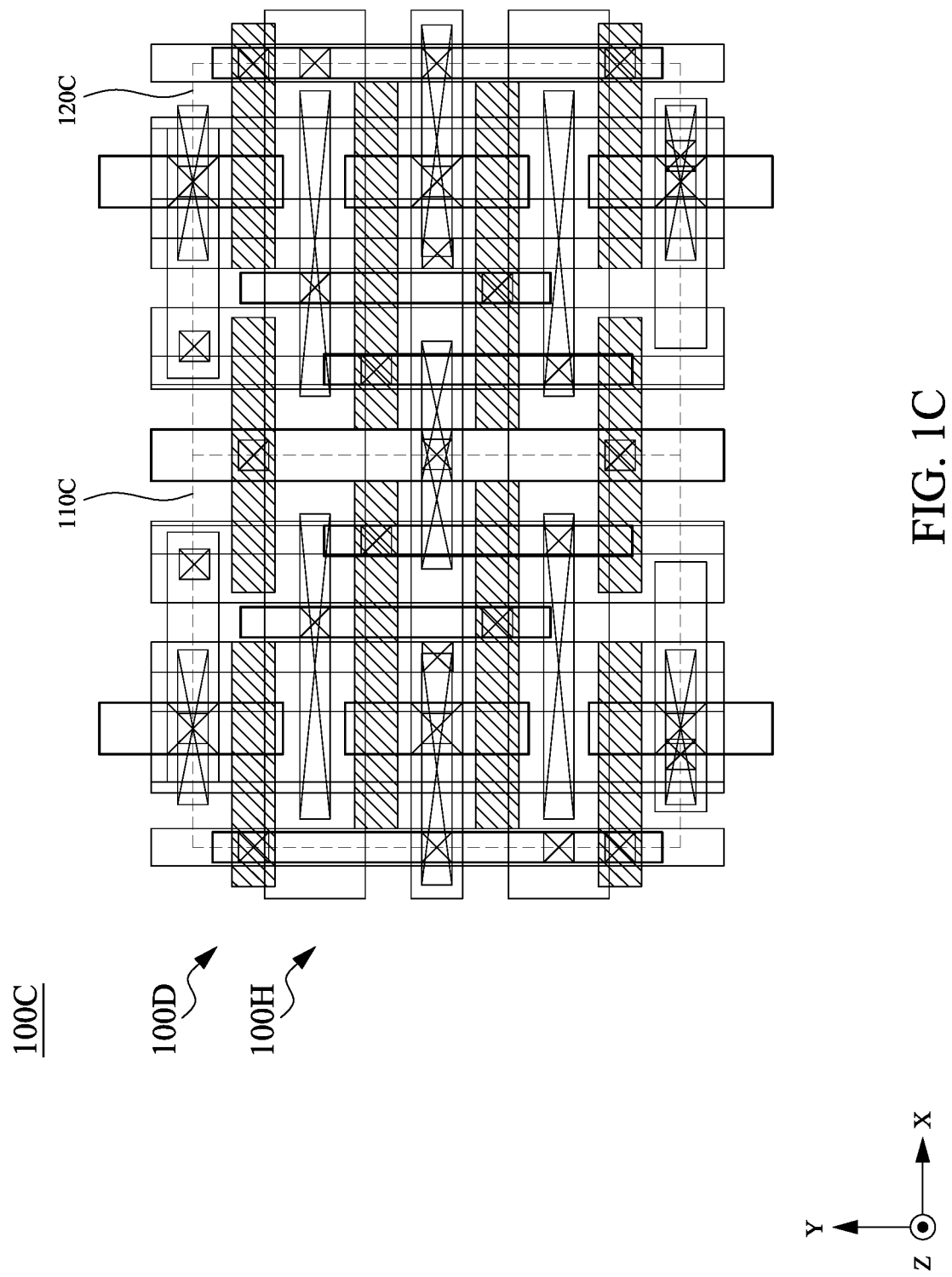
FIG. 1C is a layout diagram of a semiconductor device corresponding to the semiconductor device shown in FIG. 1A, in accordance with some embodiments of the present disclosure.

FIG. 1C is a layout diagram of a semiconductor device 100C corresponding to the semiconductor device 100A shown in FIG. 1A, in accordance with some embodiments of the present disclosure. As illustratively shown in FIG. 1C, the semiconductor device 100C includes portions 100D and 100H. The portions 100D and 100H are arranged in order along a Z direction which points out from the paper. The portion 100H is disposed on and contacts with the portion 100D. Further details of the portions 100D and 100H are described below with embodiments associated with FIG. 1D and FIG. 1H, respectively.

As illustratively shown in FIG. 1C, the semiconductor device 100C includes memory cells 110C and 120C are formed by the portions 100D and 100H. In various embodiments, the memory cells 110C and 120C are formed by various structures, such as the structures shown in FIG. 2A, FIG. 3B and FIG. 4A. The memory cells 110C and 120C are arranged in order along an X direction, which is perpendicular with the Z direction in some embodiments. Referring to FIG. 1A and FIG. 1C, the semiconductor device 100C is an embodiment of the semiconductor device 100A. The memory cell 110A is implemented by one of the memory cells 110C and 120C in some embodiments.

Figure 1D:
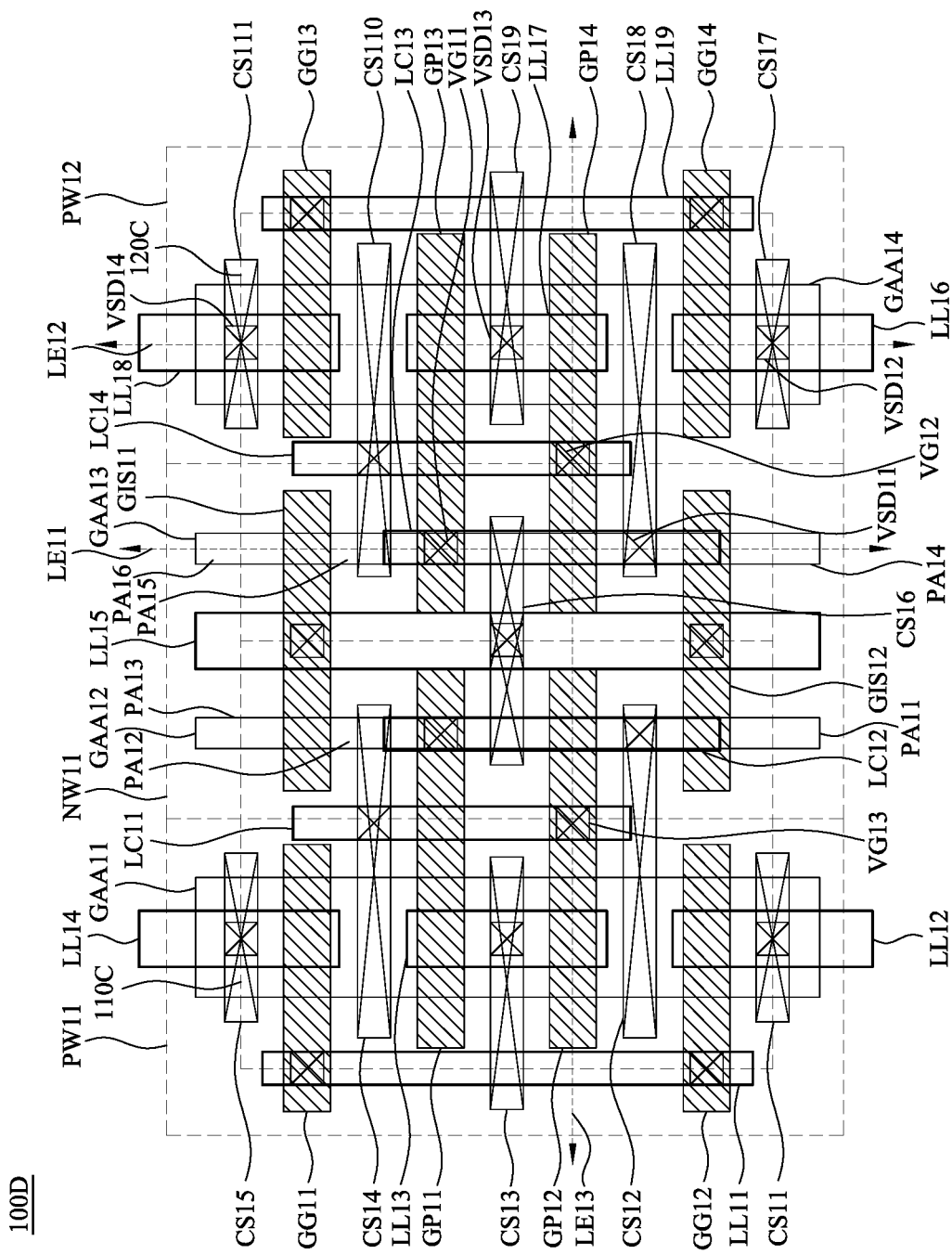
FIG. 1D is a layout diagram of a portion of the semiconductor device shown in FIG. 1C, in accordance with some embodiments of the present disclosure.

FIG. 1D is a layout diagram of the portion 100D of the semiconductor device 100C shown in FIG. 1C, in accordance with some embodiments of the present disclosure. As illustratively shown in FIG. 1D, the portion 100D includes wells PW11-PW12, NW11, active areas GAA11-GAA14, gate structures GP11-GP14, GIS11, GIS12, GG11-GG14, contact structures CS11-CS111, local connections LC11-LC14 and landing lines LL11-LL19.

In some embodiments, the well NW11 is implemented by N-type material, and the wells PW11-PW12 are implemented by P-type material. The active areas GAA11-GAA14 are implemented by oxide-diffusion (OD) material. The gate structures GP11-GP14, GIS11, GIS12 and GG11-GG14 are implemented by poly-silicon material. The contact structures CS11-CS111, the local connections LC11-LC14 and the landing lines LL11-LL19 are implemented by conductive segments, such as metal segments.

As illustratively shown in FIG. 1D, the wells PW11, NW11 and PW12 are arranged in order along the X direction. Each of the active areas GAA11-GAA14 extends along a Y direction, which is perpendicular with the X direction and the Z direction in some embodiments. The active areas GAA11-GAA14 arranged in order along the X direction. The active areas GAA11 and GAA14 are formed on the wells PW11 and PW12, respectively. Each of the active areas GAA12 and GAA13 is formed on the well NW11.

As illustratively shown in FIG. 1D, each of the gate structures GP11-GP14, GIS11, GIS12 and GG11-GG14 extends along the X direction. The gate structures GG12, GP12, GP11 and GG11 are arranged in order along the Y direction. Each of the gate structures GIS12 and GG14 is aligned with the gate structure GG12 along the X direction. Each of the gate structures GIS11 and GG13 is aligned with the gate structure GG11 along the X direction. The gate structure GP13 is aligned with the gate structure GP11 along the X direction. The gate structure GP14 is aligned with the gate structure GP12 along the X direction.

As illustratively shown in FIG. 1D, each of the gate structures GG11 and GG12 crosses over the active region GAA11. Each of the gate structures GP11 and GP12 crosses over the active regions GAA11 and GAA12. Each of the gate structures GIS11 and GIS12 crosses over the active regions GAA12 and GAA13. Each of the gate structures GG13 and GG14 crosses over the active region GAA14. Each of the gate structures GP13 and GP14 crosses over the active regions GAA13 and GAA14.

As illustratively shown in FIG. 1D, each the contact structures CS11-CS111 extends along the X direction. The contact structures CS11-CS15 are arranged in order along the Y direction. The contact structures CS11, CS12, CS14 and CS15 are aligned with the contact structures CS17, CS18, CS110 and CS111, respectively, along the X direction. Each of the contact structures CS16 and CS19 is aligned with the contact structure CS13 along the X direction. The gate structure GG11 is disposed between the contact structures CS15 and CS14. The gate structure GP11 is disposed between the contact structures CS13 and CS14. The gate structure GP12 is disposed between the contact structures CS13 and CS12. The gate structure GG12 is disposed between the contact structures CS12 and CS11.

As illustratively shown in FIG. 1D, each of the contact structure CS11, CS13 and CS15 crosses over and contacts with the active area GAA11. Each of the contact structures CS12 and CS14 crosses over and contacts with the active areas GAA11 and GAA12. The contact structure CS16 crosses over and contacts with the active areas GAA12 and GAA13. Each of the contact structure CS17, CS19 and CS111 crosses over and contacts with the active area GAA14. Each of the contact structures CS18 and CS110 crosses over and contacts with the active areas GAA13 and GAA14.

As illustratively shown in FIG. 1D, each of the local connections LC11-LC14 and the landing lines LL11-LL19 extends along the Y direction. The landing lines LL11, LL12, the local connections LC11-LC14, and the landing lines LL16, LL19 are arranged in order along the X direction. Each of the landing lines LL13 and LL14 is aligned with the landing line LL12 along the Y direction. Each of the landing lines LL17 and LL18 is aligned with the landing line LL16 along the Y direction.

As illustratively shown in FIG. 1D, the landing line LL11 crosses over the gate structures GG11 and GG12, and is coupled to the gate structures GG11 and GG12 through corresponding gate vias. The landing line LL12 crosses over the gate structure GG12 and the contact structure CS11, and is coupled to the contact structure CS11 through a source/drain via. The landing line LL13 crosses over the gate structures GP11, GP12 and the contact structure CS13, and is coupled to the contact structure CS13 through a source/drain via. The landing line LL14 crosses over the gate structure GG11 and the contact structure CS15, and is coupled to the contact structure CS15 through a source/drain via.

As illustratively shown in FIG. 1D, the landing line LL19 crosses over the gate structures GG13 and GG14, and is coupled to the gate structures GG13 and GG14 through corresponding gate vias. The landing line LL16 crosses over the gate structure GG14 and the contact structure CS17, and is coupled to the contact structure CS17 through a source/drain via VSD12. The landing line LL17 crosses over the gate structures GP13, GP14 and the contact structure CS19, and is coupled to the contact structure CS19 through a source/drain via VSD13. The landing line LL18 crosses over the gate structure GG13 and the contact structure CS111, and is coupled to the contact structure CS111 through a source/drain via VSD14. The landing line LL15 crosses over the gate structures GIS11, GIS12 and the contact structure CS16, is coupled to the gate structures GIS11 and GIS12 through corresponding gate vias, and is coupled to the contact structure CS16 through a source/drain via.

As illustratively shown in FIG. 1D, the local connection LC11 crosses over the gate structures GP11, GP12 and the contact structure CS14, is coupled to the gate structure GP12 through a gate via VG13, and is coupled to the contact structure CS14 through a source/drain via. The local connection LC12 crosses over the gate structures GP11, GP12 and the contact structure CS12, is coupled to the gate structure GP11 through a gate via, and is coupled to the contact structure CS12 through a source/drain via. The local connection LC13 crosses over the gate structures GP13, GP14 and the contact structure CS18, is coupled to the gate structure GP13 through a gate via VG11, and is coupled to the contact structure CS18 through a source/drain via VSD11. The local connection LC14 crosses over the gate structures GP13, GP14 and the contact structure CS110, is coupled to the gate structure GP14 through a gate via VG12, and is coupled to the contact structure CS110 through a source/drain via.

As illustratively shown in FIG. 1D, the active area GAA12 includes portions PA11-PA13 arranged in order along the Y direction. The portion PA11 and PA12 are disposed at opposite sides of the gate structure GIS12. The portion PA13 and PA12 are disposed at opposite sides of the gate structure GIS11. The active area GAA13 includes portions PA14-PA16 arranged in order along the Y direction. The portion PA14 and PA15 are disposed at the opposite sides of the gate structure GIS12. The portion PA16 and PA15 are disposed at the opposite sides of the gate structure GIS11.

In some embodiments, in response to the gate structure GIS11 receiving a reference voltage signal, such as the reference voltage signal CVDD shown in FIG. 1A, the gate structure GIS11 isolates the portion PA12 from the portion PA13, and isolates the portion PA15 from the portion PA16. In response to the gate structure GIS12 receiving the reference voltage signal, the gate structure GIS12 isolates the portion PA12 from the portion PA11, and isolates the portion PA15 from the portion PA14.

Referring to FIG. 1B to FIG. 1D, in some embodiments, the memory cell 110A is implemented by the memory cell 110C. In such embodiments, the gate terminals of the switches PU11 and PD11 correspond to the gate structure GP11. The gate terminals of the switches PU12 and PD12 correspond to the gate structure GP12. The gate terminals of the switches PG11, PG12, IS11 and IS12 correspond to the gate structures GG11, GG12, GIS11 and GIS12, respectively.

Referring to FIG. 1C and FIG. 1D, in some embodiments, the memory cell 110C is configured to store a first data signal and a first complementary data signal at the local connections LC11 and LC12, respectively. The memory cell 120C is configured to store a second data signal and a second complementary data signal at the local connections LC14 and LC13, respectively. The first data signal is different from the second data signal and is complementary with the first complementary data signal. The second data signal is complementary with the second complementary data signal.

In such embodiments, the source/drain terminals of the switches IS11, IS12, PU11 and PU12 correspond to the active area GAA12. The source/drain terminals of the switches PG11, PG12, PD11 and PD12 correspond to the active area GAA11. The node N11 corresponds to the local connection LC11 and the contact structure CS14. The node N12 corresponds to the local connection LC12 and the contact structure CS12. The landing line LL11 is configured to transmit the word line signal WLS1 to the switches PG11 and PG12. The landing line LL13 is configured to transmit the reference voltage signal CVSS to the switches PD11 and PD12. The landing line LL15 is configured to transmit the reference voltage signal CVDD to the switches IS11, IS12, PU11 and PU12. The landing line LL14 is configured to transmit the bit line signal BLS1 to the switch PG11. The landing line LL12 is configured to transmit the bit line signal BLBS1 to the switch PG12.

Referring to FIG. 1B to FIG. 1D, in some embodiments, the memory cell 110A is implemented by the memory cell 120C. In such embodiments, the gate terminals of the switches PU11 and PD11 correspond to the gate structure GP13. The gate terminals of the switches PU12 and PD12 correspond to the gate structure GP14. The gate terminals of the switches PG11, PG12, IS11 and IS12 correspond to the gate structures GG13, GG14, GIS11 and GIS12, respectively.

In such embodiments, the source/drain terminals of the switches IS11, IS12, PU11 and PU12 correspond to the active area GAA13. The source/drain terminals of the switches PG11, PG12, PD11 and PD12 correspond to the active area GAA14. The node N11 corresponds to the local connection LC14 and the contact structure CS110. The node N12 corresponds to the local connection LC13 and the contact structure CS18. The landing line LL19 is configured to transmit the word line signal WLS1 to the switches PG11 and PG12. The landing line LL17 is configured to transmit the reference voltage signal CVSS to the switches PD11 and PD12. The landing line LL15 is configured to transmit the reference voltage signal CVDD to the switches IS11, IS12, PU11 and PU12. The landing line LL18 is configured to transmit the bit line signal BLS1 to the switch PG11. The landing line LL16 is configured to transmit the bit line signal BLBS1 to the switch PG12.

In some approaches, active areas of a memory cell extend into and electrically coupled to adjacent memory cells, such that non-necessary leakage currents between the memory cells occur. As a result, the memory device has poor performance and worse device matching.

Compared to the above approaches, in some embodiments of the present disclosure, the landing line LL15 provides the reference voltage signal CVDD to the gate structures GIS11 and GIS12 to turn off the switches IS11 and IS12, to isolate adjacent memory cells coupled to the portions PA11, PA13, PA14 and PA15. Accordingly, the leakage currents between the memory cells are reduced. The portion 100D has fully symmetry and therefore devices stability and cell matching are improved. The active areas GAA12 and GAA13 are continuous and therefore OD line end shrink control problem and length effect are solved. Amounts of the active areas, the landing lines and the local connections are low and therefore the portion 100D has high capacity for cell scaling.

Figure 1E:
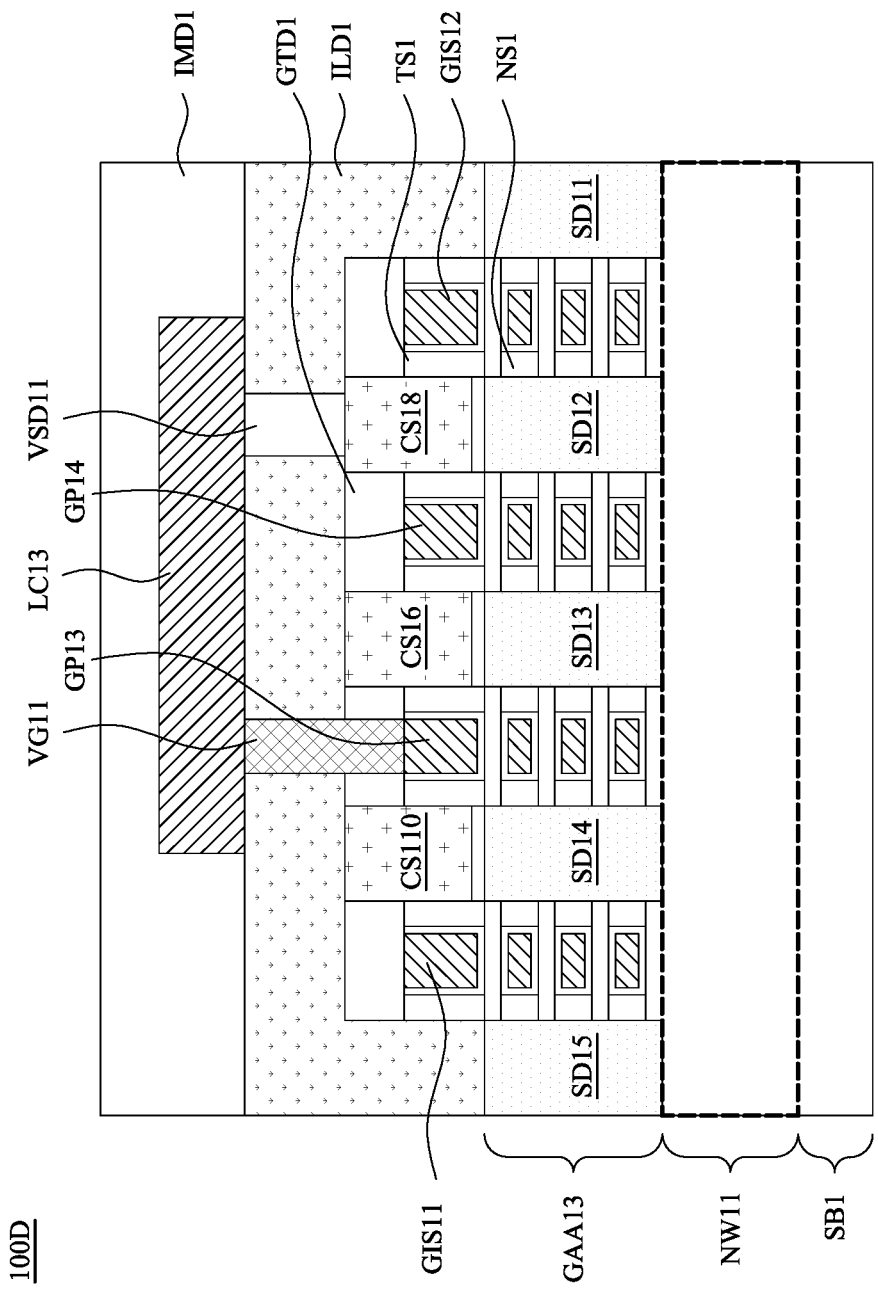
FIG. 1E is a cross section diagram of the portion along a line shown in FIG. 1D, in accordance with some embodiments of the present disclosure.

FIG. 1E is a cross section diagram of the portion 100D along the line LE11 shown in FIG. 1D, in accordance with some embodiments of the present disclosure. The X direction points into the paper in FIG. 1E. As illustratively shown in FIG. 1E, the portion 100D further includes a substrate SB1, and the well NW11 is formed on the substrate SB1. The active area GAA13 is formed on the well NW11. The gate structures GIS11, GIS12, GP13 and GP14 are disposed on the active region GAA13 to form a gate-all-around structure. In some embodiments, the active region GAA13 has a horizontal nano-sheet structure.

As illustratively shown in FIG. 1E, the active area GAA13 includes source/drain regions SD11-SD15 and inner spacers NS1. The source/drain regions SD11-SD15 are arranged in order along the Y direction. The contact structures CS18, CS16 and CS110 are disposed on and contact with the source/drain regions SD12-SD14, respectively. The inner spacers NS1 are formed between the source/drain regions SD11-SD15 and the gate structures GIS11, GIS12, GP13 and GP14, to separate the source/drain regions SD11-SD15 from the gate structures GIS11, GIS12, GP13 and GP14.

As illustratively shown in FIG. 1E, the portion 100D further includes top spacers TS1, gate top dielectrics GTD1, inter-layer dielectrics ILD1 and inter-metal dielectrics IMD1. The top spacers TS1 are disposed on the top of the active area GAA13, and are disposed between the gate structures GIS11, GIS12, GP13, GP14 and the contact structures CS18, CS16, CS110. The gate top dielectrics GTD1 are disposed on the gate structures GIS11, GIS12, GP13, GP14 and the top spacers TS1. The inter-layer dielectrics ILD1 are disposed on the contact structures CS18, CS16, CS110, the gate top dielectrics GTD1 and the active area GAA13. The inter-metal dielectrics IMD1 are disposed on the inter-layer dielectrics ILD1 and the local connection LC13.

As illustratively shown in FIG. 1E, the gate via VG11 is interposed into the gate top dielectrics GTD1 and the inter-layer dielectrics ILD1, to contact the gate structure GP13 and the local connection LC13. The source/drain via VSD11 is interposed into the inter-layer dielectrics ILD1, to contact the contact structure CS18 and the local connection LC13. The local connection LC13 is disposed on the inter-layer dielectrics ILD1.

Figure 1F:
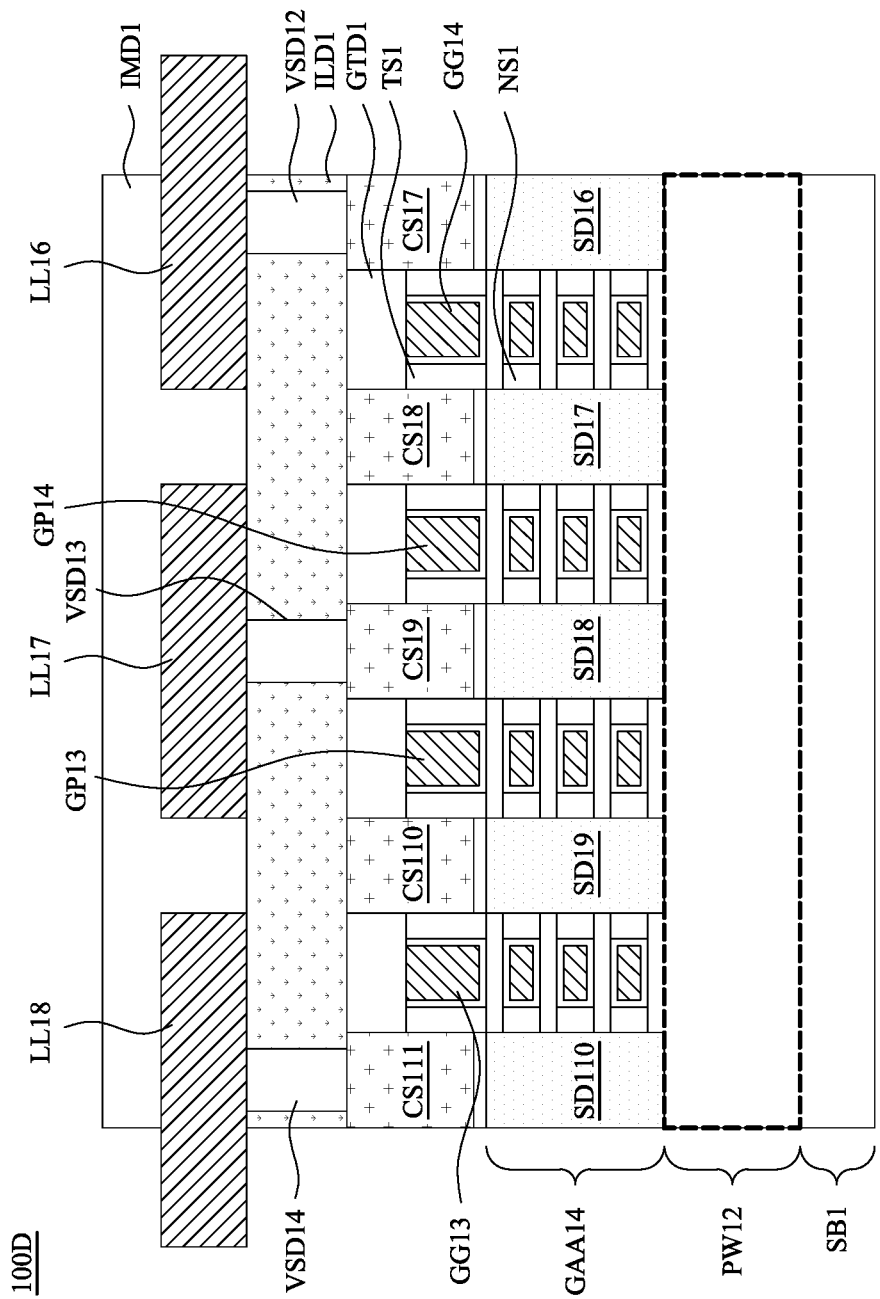
FIG. 1F is a cross section diagram of the portion along a line shown in FIG. 1D, in accordance with some embodiments of the present disclosure.

FIG. 1F is a cross section diagram of the portion 100D along the line LE12 shown in FIG. 1D, in accordance with some embodiments of the present disclosure. The X direction points into the paper in FIG. 1F. As illustratively shown in FIG. 1F, the well PW12 is formed on the substrate SB1. The active area GAA14 is formed on the well PW12. The gate structures GG13, GG14, GP13 and GP14 are disposed on the active region GAA14 to form a gate-all-around structure. In some embodiments, the active region GAA14 has a horizontal nano-sheet structure.

As illustratively shown in FIG. 1F, the active area GAA14 includes source/drain regions SD16-SD110 and the inner spacers NS1. The source/drain regions SD16-SD110 are arranged in order along the Y direction. The contact structures CS17-CS111 are disposed on and contact with the source/drain regions SD16-SD110, respectively. The inner spacers NS1 are formed between the source/drain regions SD16-SD110 and the gate structures GG13, GG14, GP13, GP14, to separate the source/drain regions SD16-SD110 from the gate structures GG13, GG14, GP13 and GP14.

As illustratively shown in FIG. 1F, the top spacers TS1 are disposed on the top of the active area GAA14, and are disposed between the gate structures GG13, GG14, GP13, GP14 and the contact structures CS17-CS111. The gate top dielectrics GTD1 are disposed on the gate structures GG13, GG14, GP13, GP14 and the top spacers TS1. The inter-layer dielectrics ILD1 are disposed on the contact structures CS17-CS111 and the gate top dielectrics GTD1. The inter-metal dielectrics IMD1 are disposed on the inter-layer dielectrics ILD1 and the landing lines LL16-LL18.

As illustratively shown in FIG. 1F, the source/drain via VSD12 is interposed into the inter-layer dielectrics ILD1, to contact the contact structure CS17 and the landing line LL16. The source/drain via VSD13 is interposed into the inter-layer dielectrics ILD1, to contact the contact structure CS19 and the landing line LL17. The source/drain via VSD14 is interposed into the inter-layer dielectrics ILD1, to contact the contact structure CS111 and the landing line LL18. The landing lines LL16-LL18 are disposed on the inter-layer dielectrics ILD1.

Figure 1G:
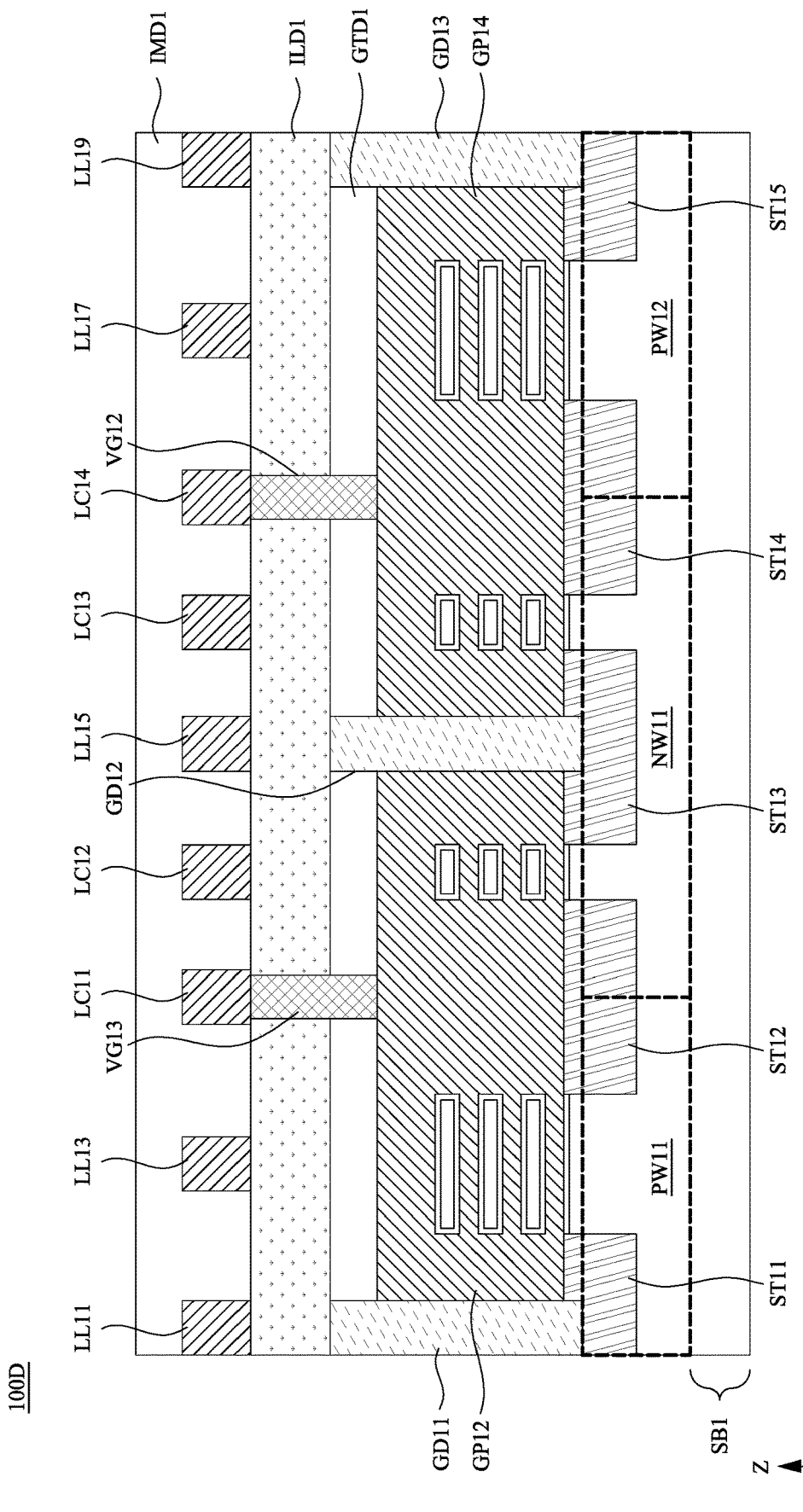
FIG. 1G is a cross section diagram of the portion along a line shown in FIG. 1D, in accordance with some embodiments of the present disclosure.

FIG. 1G is a cross section diagram of the portion 100D along the line LE13 shown in FIG. 1D, in accordance with some embodiments of the present disclosure. The Y direction points into the paper in FIG. 1G.

As illustratively shown in FIG. 1G, the wells PW11, NW11 and PW12 are formed on the substrate SB1. The portion 100D further includes shallow trench isolations ST11-ST15 and gate end dielectrics GD11-GD13. The shallow trench isolations ST11-ST15 are interposed into the wells PW11, NW11 and PW12, and are arranged in order along the X direction. The shallow trench isolation ST12 is disposed at a boundary between the wells PW11 and NW11. The shallow trench isolation ST14 is disposed at a boundary between the wells PW12 and NW11.

As illustratively shown in FIG. 1G, the gate end dielectrics GD11-GD13 are arranged in order along the X direction. The gate end dielectric GD11 is disposed on the shallow trench isolation ST11, and extends along the Z direction to contact the inter-layer dielectrics ILD1. The gate end dielectric GD13 is disposed on the shallow trench isolation ST15, and extends along the Z direction to contact the inter-layer dielectrics ILD1. The gate end dielectric GD12 is disposed on the shallow trench isolation ST13, and extends along the Z direction to contact the inter-layer dielectrics ILD1, to isolate the gate structures GP12 and GP14 from each other.

As illustratively shown in FIG. 1G, the gate via VG13 is disposed on the gate structure GP12 and contacts with the gate structure GP12 and the local connection LC11. The gate via VG12 is disposed on the gate structure GP14 and contacts with the gate structure GP14 and the local connection LC14. The landing lines LL11, LL13, LL15, LL17, LL19 and the local connections LC11-LC14 are disposed on the inter-layer dielectrics ILD1.

Figure 1H:
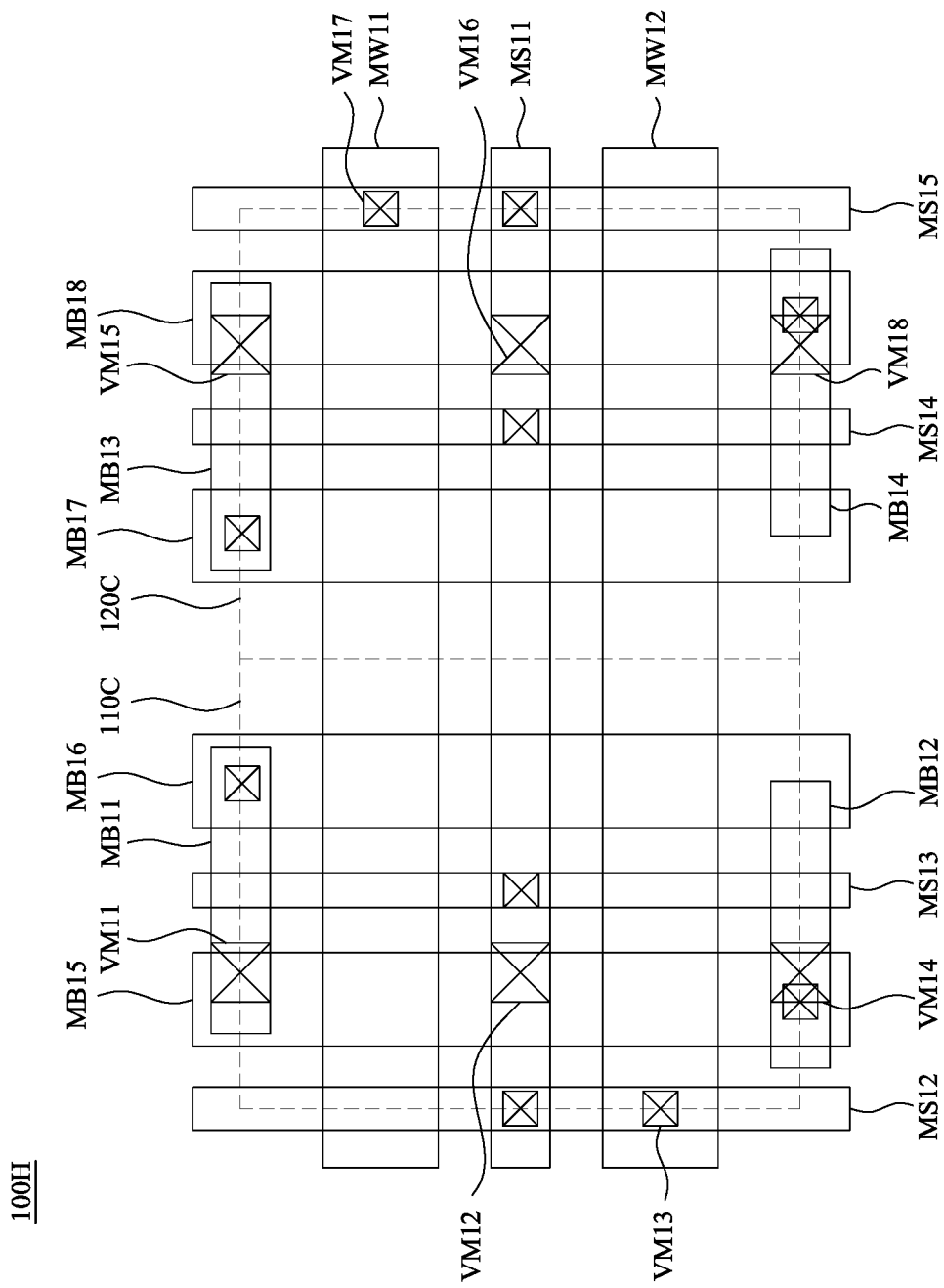
FIG. 1H is a layout diagram of a portion of the semiconductor device 100C shown in FIG. 1C, in accordance with some embodiments of the present disclosure.

FIG. 1H is a layout diagram of the portion 100H of the semiconductor device 100C shown in FIG. 1C, in accordance with some embodiments of the present disclosure. As illustratively shown in FIG. 1H, the portion 100H includes conductive segments MS11-MS15, MW11, MW12, MB11-MB18 and vias VM11-VM18. In some embodiments, the conductive segments MS11-MS15, MW11, MW12, MB11-MB18 and the vias VM11-VM18 are implemented by metal or other conductive materials.

As illustratively shown in FIG. 1H, each of the conductive segments MS11, MW11, MW12 and MB11-MB14 extends along the X direction. The conductive segments MB12, MW12, MS11, MW11 and MB11 are arranged in order along the Y direction. The conductive segment MB14 is aligned with the conductive segment MB12 along the X direction. The conductive segment MB13 is aligned with the conductive segment MB11 along the X direction. Each of the conductive segments MS12-MS15 and MB15-MB18 extends along the Y direction. The conductive segments MS12, MB15, MS13, MB16, MB17, MS14, MB18 and MS15 are arranged in order along the X direction.

As illustratively shown in FIG. 1H, each of the conductive segments MS12, MB16, MB17 and MS15 crosses over the conductive segments MW12, MS11 and MW11. Each of conductive segments MB15 and MS13 crosses over the conductive segments MB12, MW12, MS11, MW11 and MB11. Each of conductive segments MB18 and MS14 crosses over the conductive segments MB14, MW12, MS11, MW11 and MB13.

As illustratively shown in FIG. 1H, each of the conductive segments MS12-MS15 is coupled to the conductive segment MS11 through a corresponding via. The conductive segments MB15-MB18 are coupled to the conductive segments MB12, MB11, MB13 and MB14, respectively, through corresponding vias.

Referring to FIG. 1C, FIG. 1D and FIG. 1H, the conductive segment MS11 crosses over the landing lines LL13 and LL17, and is coupled to the landing lines LL13 and LL17 through the vias VM12 and VM16, respectively. The conductive segment MW11 crosses over the landing line LL19 and is coupled to the landing line LL19 through the via VM17. The conductive segment MW12 crosses over the landing line LL11 and is coupled to the landing line LL11 through the via VM13. The conductive segment MB11 crosses over the landing line LL14 and is coupled to the landing line LL14 through the via VM11. The conductive segment MB12 crosses over the landing line LL12 and is coupled to the landing line LL12 through the via VM14. The conductive segment MB13 crosses over the landing line LL18 and is coupled to the landing line LL18 through the via VM15. The conductive segment MB14 crosses over the landing line LL16 and is coupled to the landing line LL16 through the via VM18.

Referring to FIG. 1B, FIG. 1D and FIG. 1H, in some embodiments, each of the conductive segments MS12-MS15 is configured to receive the voltage signal CVSS, and transmit the voltage signal CVSS to the landing lines LL13 and LL17 through the conductive segment MS11 and the vias VM12, VM16.

In the embodiments those the memory cell 110A is implemented by the memory cell 110C, the conductive segment MB16 is configured to receive the bit line signal BLS1, and transmit the bit line signal BLS1 to the landing line LL14 through the conductive segment MB11 and the via VM11. The conductive segment MB15 is configured to receive the bit line signal BLBS1, and transmit the bit line signal BLBS1 to the landing line LL12 through the conductive segment MB12 and the via VM14. The conductive segment MW12 is configured to receive the word line signal WLS1, and transmit the word line signal WLS1 to the landing line LL11 through the via VM13.

In the embodiments those the memory cell 110A is implemented by the memory cell 120C, the conductive segment MB17 is configured to receive the bit line signal BLS1, and transmit the bit line signal BLS1 to the landing line LL18 through the conductive segment MB13 and the via VM15. The conductive segment MB18 is configured to receive the bit line signal BLBS1, and transmit the bit line signal BLBS1 to the landing line LL16 through the conductive segment MB14 and the via VM18. The conductive segment MW11 is configured to receive the word line signal WLS1, and transmit the word line signal WLS1 to the landing line LL19 through the via VM17.

In some embodiments, the conductive segments MW11 and MW12 are configured to receive different word line signals. The memory cell 110C is configured to receive a word line signal, such as a word line signal WS25 shown in FIG. 2G, from the conductive segment MW12, and the memory cell 120C is configured to receive another word line signal, such as a word line signal WS26 shown in FIG. 2G, from the conductive segment MW11.

Referring to FIG. 1H, FIG. 1D and FIG. 1C, in some embodiments, the landing lines LL11-LL19 and the local connections LC11-LC14 are located in a metal-one (M1) layer, the conductive segments MS11, MW11, MW12 and MB11-MB14 are located in a metal-two (M2) layer above the M1 layer, and the conductive segments MS12-MS15 and MB15-MB18 are located in a metal-three (M3) layer above the M2 layer.

In some approaches, conductive segments receiving bit line signals are located in M1 layer. As a result, the corresponding resistance-capacitance (RC) are large.

Compared to the above approaches, in some embodiments of the present disclosure, the conductive segments MW11 and MW12 receive different word line signal, and the conductive segments MB15-MB18 are located in M3 layer. With such structure, the bit line RC is reduced. For example, the capacitances of front end of line (FEOL) and middle end of line (MEOL) are improved by approximately 50%.

Figure 2A:
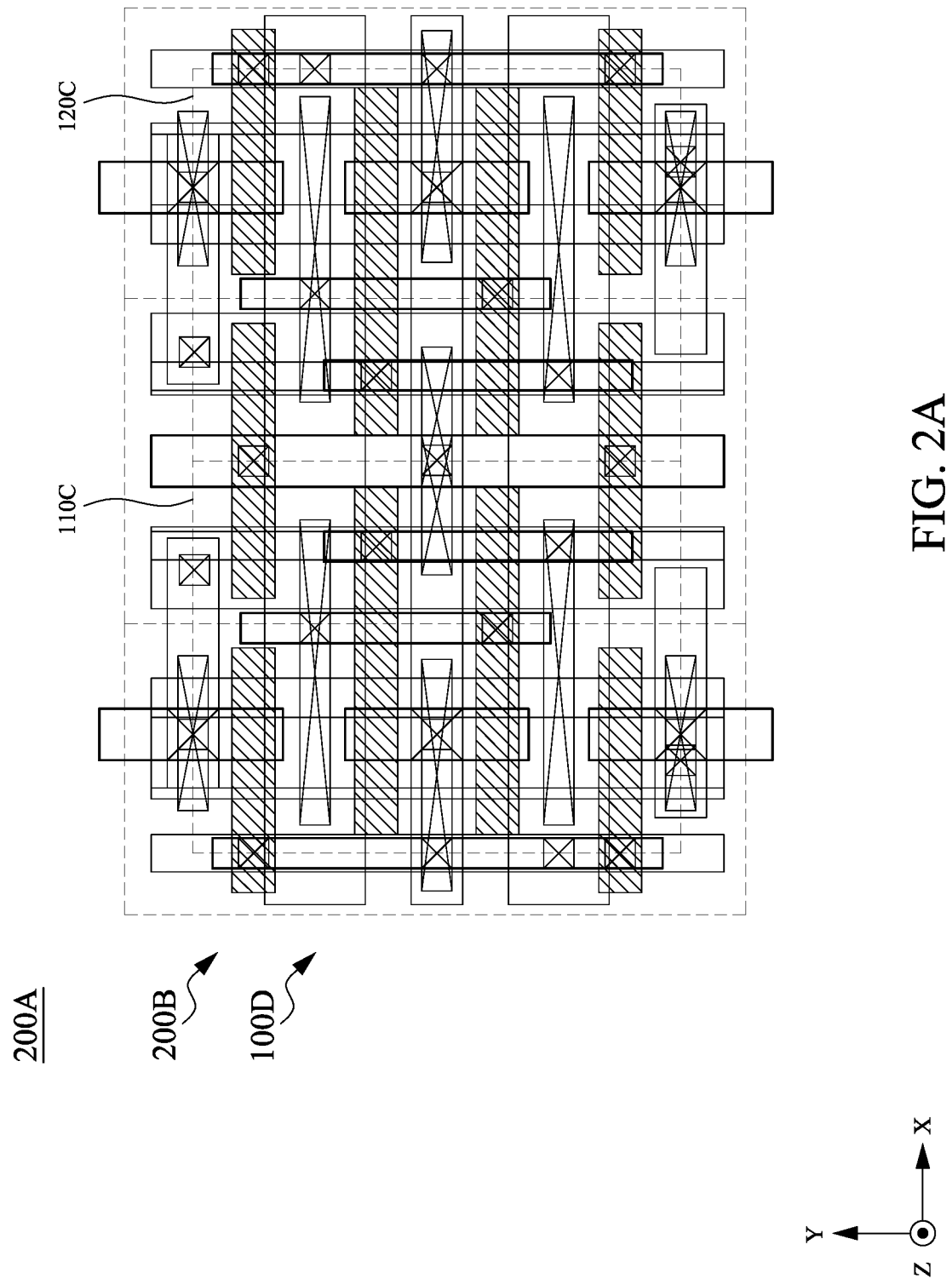
FIG. 2A is a layout diagram of a semiconductor device corresponding to the semiconductor device shown in FIG. 1C, in accordance with some embodiments of the present disclosure.

FIG. 2A is a layout diagram of a semiconductor device 200A corresponding to the semiconductor device 100C shown in FIG. 1C, in accordance with some embodiments of the present disclosure. Referring to FIG. 2A and FIG. 1C, the semiconductor device 200A is an alternative embodiment of the semiconductor device 100C. FIG. 2A follows a similar labeling convention to that of FIG. 1C. For brevity, the discussion will focus more on differences between FIG. 2A and FIG. 1C than on similarities.

Referring to FIG. 2A and FIG. 1C, comparing with the semiconductor device 100C, the semiconductor device 200A includes a portion 200B instead of the portion 100H. The portion 200B is disposed on and contacts with the portion 100D. The memory cells 110C and 120C are formed by the portions 100D and 200B. Further details of the portion 200B are described below with embodiments associated with FIG. 2B.

Figure 2B:
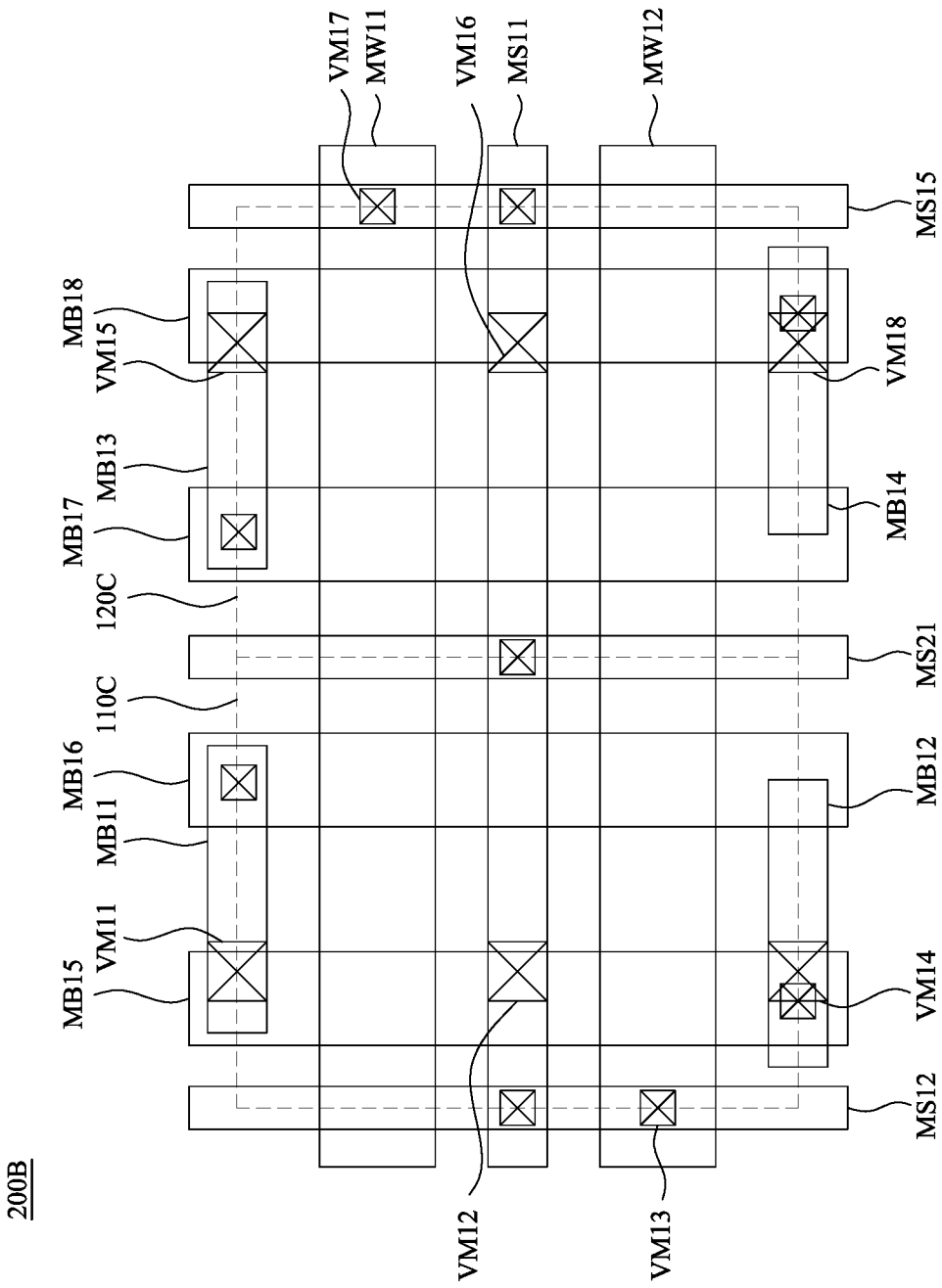
FIG. 2B is a layout diagram of a portion of the semiconductor device 200A shown in FIG. 2A, in accordance with some embodiments of the present disclosure.

FIG. 2B is a layout diagram of the portion 200B of the semiconductor device 200A shown in FIG. 2A, in accordance with some embodiments of the present disclosure. Referring to FIG. 2A and FIG. 1H, the portion 200B is an alternative embodiment of the portion 100H. FIG. 2B follows a similar labeling convention to that of FIG. 1H. For brevity, the discussion will focus more on differences between FIG. 2B and FIG. 1H than on similarities.

Referring to FIG. 2B and FIG. 1H, comparing with the portion 100H, the portion 200B includes a conductive segment MS21 instead of the conductive segments MS13 and MS14. The conductive segment MS21 is disposed between the conductive segments MB16 and MB17, and extends along the Y direction. The conductive segment MS21 is coupled to the conductive segment MS11 through a via, and configured to provide the reference voltage signal CVSS to the conductive segment MS11. In various embodiments, the portion 200B includes a combination of the conductive segments MS21 and MS12-MS15 for providing the reference voltage signal CVSS to the conductive segment MS11.

Figure 2C:
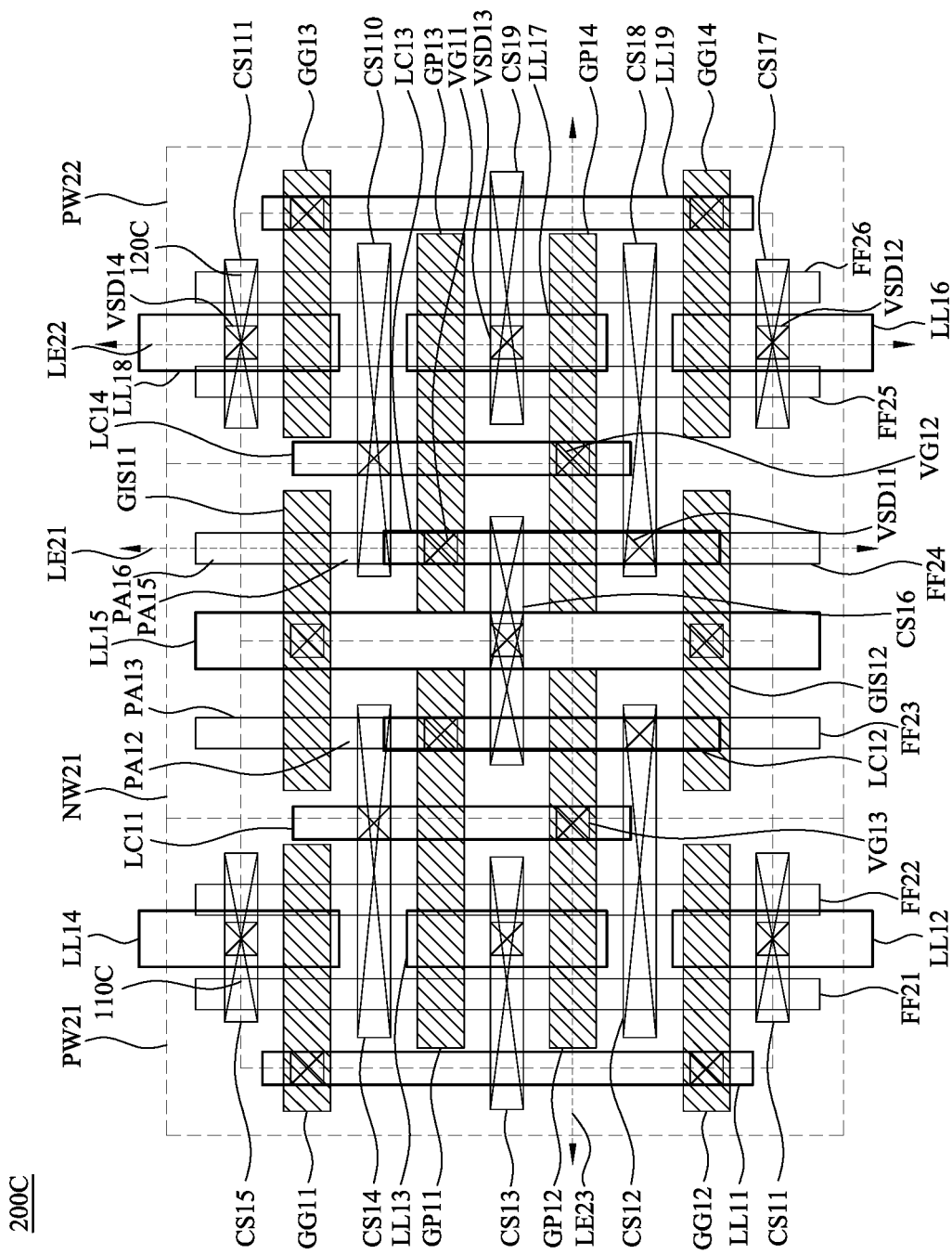
FIG. 2C is a layout diagram of a portion corresponding to the portion shown in FIG. 1D, in accordance with some embodiments of the present disclosure.

FIG. 2C is a layout diagram of the portion 200C corresponding to the portion 100D shown in FIG. 1D, in accordance with some embodiments of the present disclosure. Referring to FIG. 2C and FIG. 1D, the portion 200C is an alternative embodiment of the portion 100D. FIG. 2C follows a similar labeling convention to that of FIG. 1D. For brevity, the discussion will focus more on differences between FIG. 2C and FIG. 1D than on similarities.

Referring to FIG. 2C and FIG. 1D, comparing with the portion 100D, the portion 200C includes wells PW21, NW21, PW22 and active areas FF21-FF26 instead of the wells PW11, NW11, PW12 and the active areas GAA11-GAA14. The wells PW21, NW21 and PW22 correspond to the wells PW11, NW11 and PW12, respectively. The active areas FF21 and FF22 correspond to the active area GAA11. The active areas FF23 and FF24 correspond to the active areas GAA12 and GAA13, respectively. The active areas FF25 and FF26 correspond to the active area GAA14. In some embodiments, the active areas FF21-FF26 have fin structures and configured to form fin field-effect transistors (FinFET) with the gate structures GG11-GG14, GP11-GP14, GIS11 and GIS12.

Figure 2D:
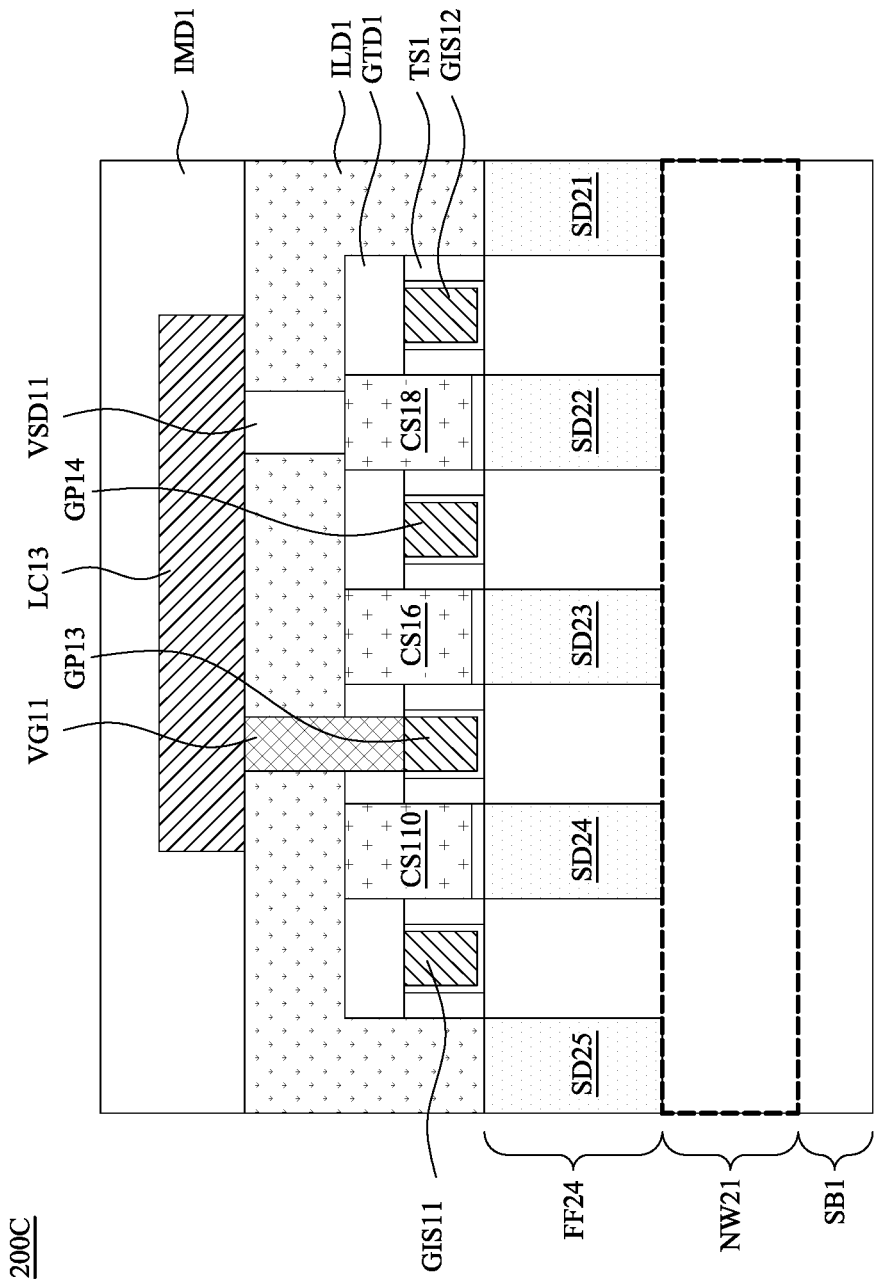
FIG. 2D is a cross section diagram of the portion along a line shown in FIG. 2C, in accordance with some embodiments of the present disclosure.
Figure 2E:
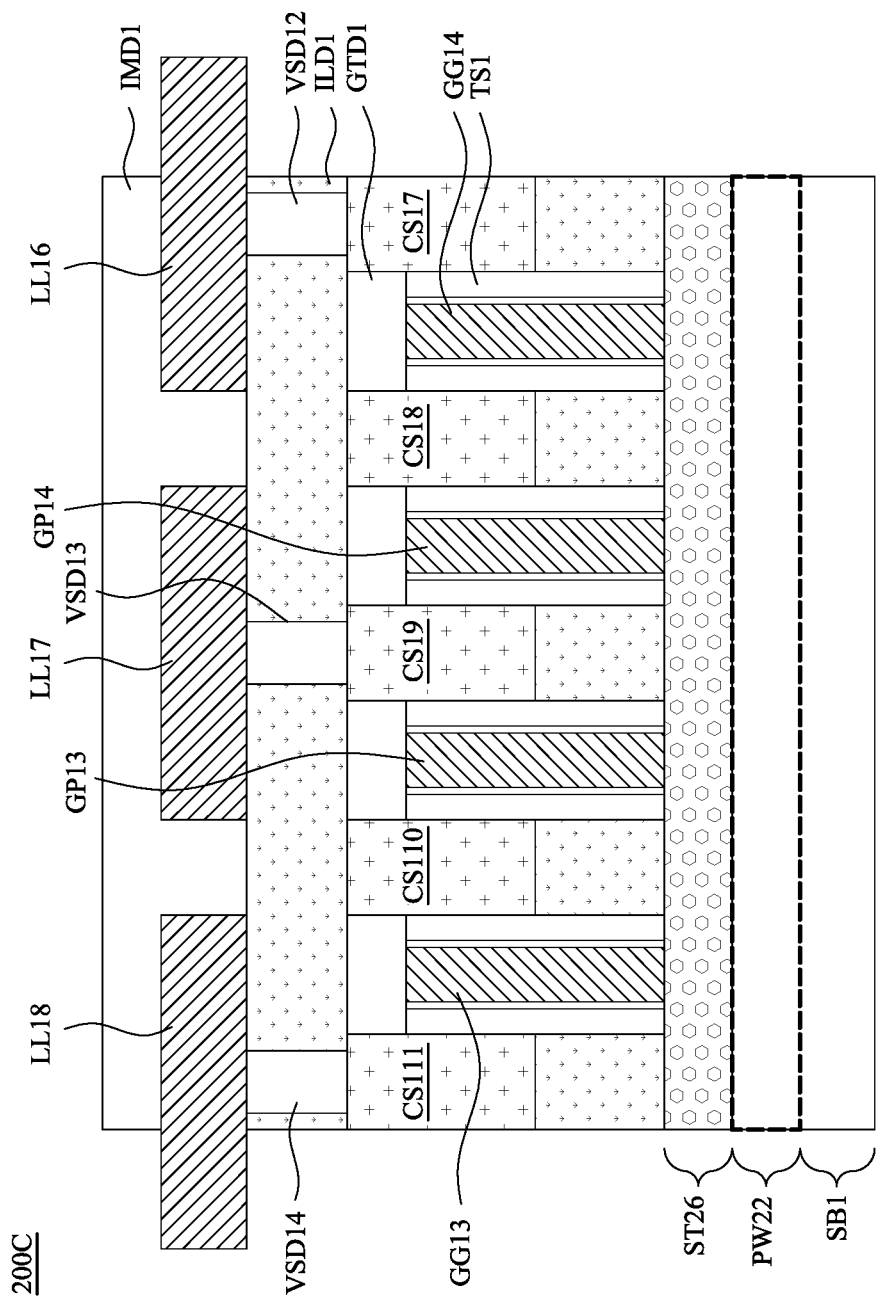
FIG. 2E is a cross section diagram of the portion along a line shown in FIG. 2C, in accordance with some embodiments of the present disclosure.
Figure 2F:
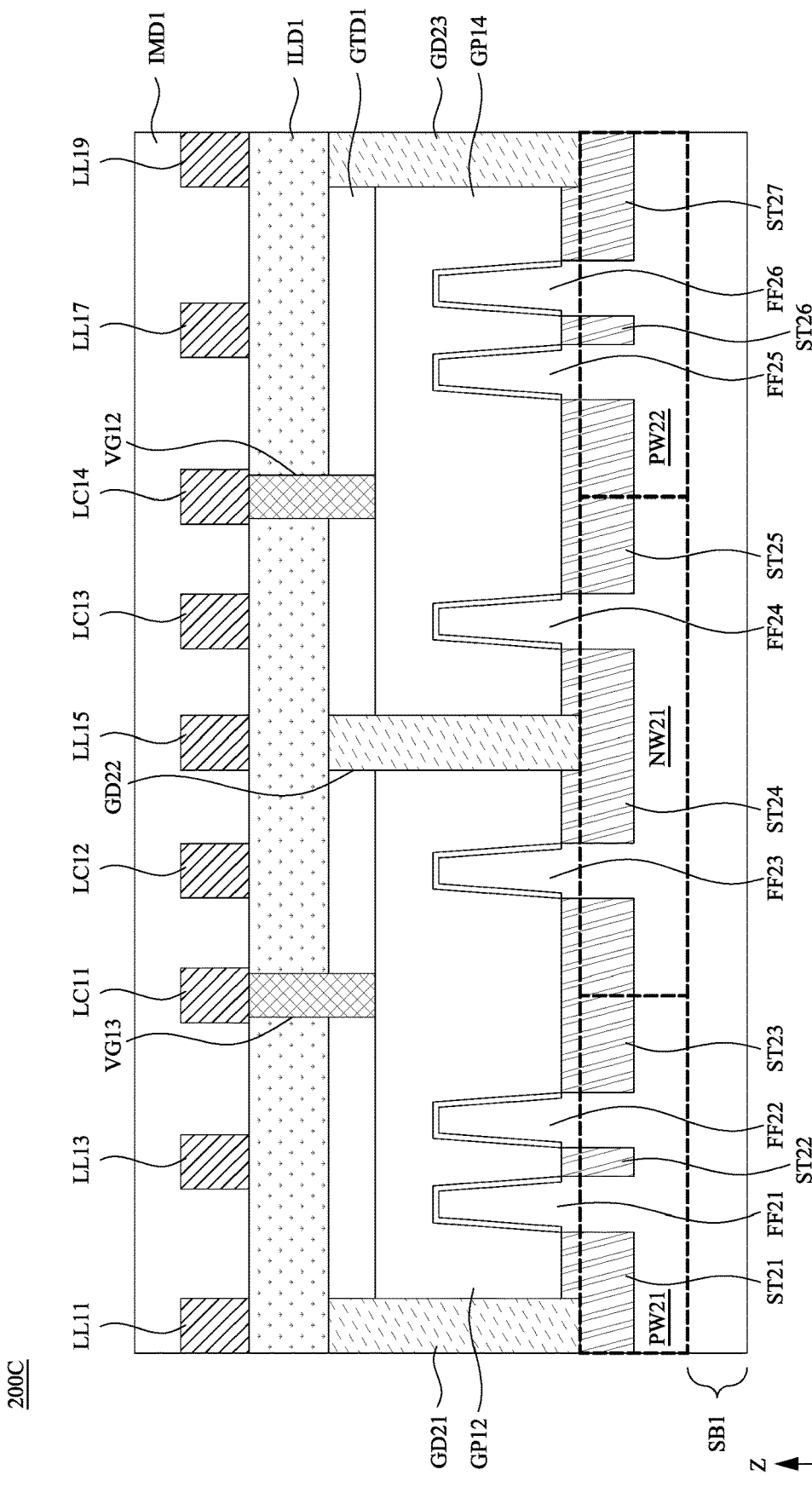
FIG. 2F is a cross section diagram of the portion along a line shown in FIG. 2C, in accordance with some embodiments of the present disclosure.
Figure 2G:
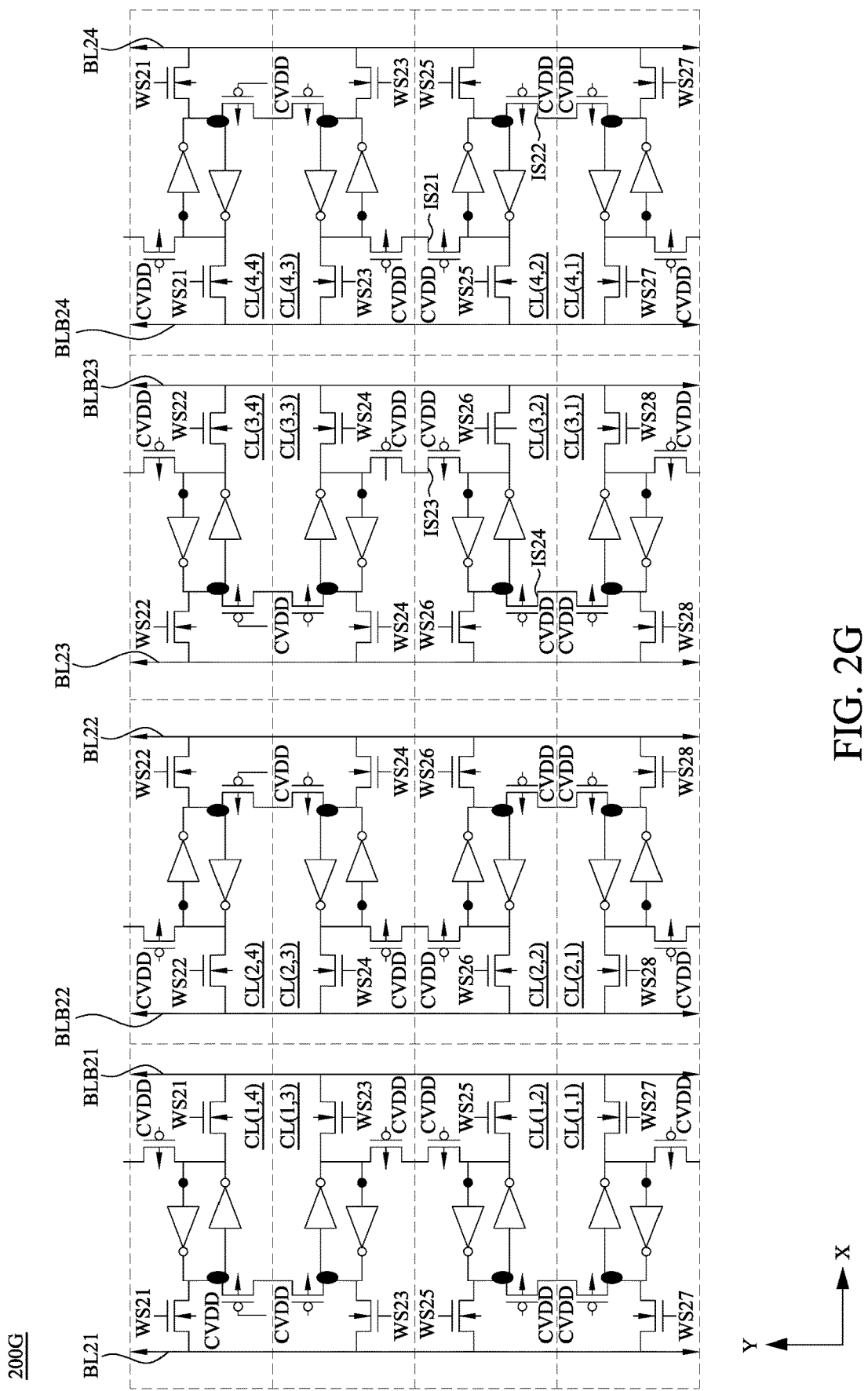
FIG. 2G is a circuit diagram of a semiconductor device corresponding to the semiconductor device shown in FIG. 1A, in accordance with some embodiments of the present disclosure.

As illustratively shown in FIG. 2G, the gate structures GG11, GG12, GP11 and GP12 are disposed on each of the active areas FF21 and FF22. The gate structures GIS11, GIS12, GP11 and GP12 are disposed on the active area FF23. The gate structures GIS11, GIS12, GP13 and GP14 are disposed on the active area FF23. The gate structures GG13, GG14, GP13 and GP14 are disposed on each of the active areas FF21 and FF22.

Referring to FIG. 2C and FIG. 1B, in some embodiments, the source/drain terminals of the switches PG11, PG12, PD11 and PD12 are implemented by the active areas FF21 and FF22, and the source/drain terminals of the switches IS11, IS12, PU11 and PU12 are implemented by the active areas FF23. In other embodiments, the source/drain terminals of the switches PG11, PG12, PD11 and PD12 are implemented by the active areas FF25 and FF26, and the source/drain terminals of the switches IS11, IS12, PU11 and PU12 are implemented by the active areas FF24.

Referring to FIG. 2C and FIG. 1C, in some alternative embodiments, the semiconductor device 100C includes the portion 200C instead of the portion 100D. In such embodiments, the portion 100H is disposed on and contacts with the portion 200C.

Referring to FIG. 2C and FIG. 2A, in some alternative embodiments, the semiconductor device 200A includes the portion 200C instead of the portion 100D. In such embodiments, the portion 200B is disposed on and contacts with the portion 200C.

FIG. 2D is a cross section diagram of the portion 200C along the line LE21 shown in FIG. 2C, in accordance with some embodiments of the present disclosure. The X direction points into the paper in FIG. 2D. Referring to FIG. 2D and FIG. 1E, the cross section diagrams of the portions 200C and 100D are similar with each other. Therefore, some descriptions are not repeated for brevity.

As illustratively shown in FIG. 2D, the portion 200C further includes the substrate SB1, and the well NW21 is formed on the substrate SB1. The active area FF24 is formed on the well NW21. The gate structures GIS11, GIS12, GP13 and GP14 are disposed on the active region FF24.

As illustratively shown in FIG. 2D, the active area GAA13 includes source/drain regions SD21-SD25. The source/drain regions SD21-SD25 are arranged in order along the Y direction. The contact structures CS18, CS16 and CS110 are disposed on and contact with the source/drain regions SD22-SD24, respectively.

As illustratively shown in FIG. 2D, the portion 200C further includes the top spacers TS1, the gate top dielectrics GTD1, the inter-layer dielectrics ILD1 and the inter-metal dielectrics IMD1. The top spacers TS1 are disposed on the top of the active area FF24, and are disposed between the gate structures GIS11, GIS12, GP13, GP14 and the contact structures CS18, CS16, CS110. The gate top dielectrics GTD1 are disposed on the gate structures GIS11, GIS12, GP13, GP14 and the top spacers TS1. The inter-layer dielectrics ILD1 are disposed on the contact structures CS18, CS16, CS110, the gate top dielectrics GTD1 and the active area FF24. The inter-metal dielectrics IMD1 are disposed on the inter-layer dielectrics ILD1 and the local connection LC13.

FIG. 2E is a cross section diagram of the portion 200C along the line LE22 shown in FIG. 2C, in accordance with some embodiments of the present disclosure. The X direction points into the paper in FIG. 2E. Referring to FIG. 2E and FIG. 1F, the cross section diagrams of the portions 200C and 100D are similar with each other. Therefore, some descriptions are not repeated for brevity.

As illustratively shown in FIG. 2E, the well PW22 is formed on the substrate SB1. The portion 200C further includes a shallow trench isolation ST26 formed on the well PW22. The gate structures GG13, GG14, GP13, GP14 and the contact structures CS17-CS111 are disposed on the shallow trench isolation ST26.

FIG. 2F is a cross section diagram of the portion 200C along the line LE13 shown in FIG. 2C, in accordance with some embodiments of the present disclosure. The Y direction points into the paper in FIG. 2F. Referring to FIG. 2F and FIG. 1G, the cross section diagrams of the portions 200C and 100D are similar with each other. Therefore, some descriptions are not repeated for brevity.

As illustratively shown in FIG. 2F, the wells PW21, NW21 and PW22 are formed on the substrate SB1. Portions of the well PW21 extend along the Z direction into the gate structure GP12 to form the active areas FF21 and FF22. Portions of the well NW21 extend along the Z direction into the gate structures GP12 and GP14 to form the active areas FF23 and FF24. Portions of the well PW22 extend along the Z direction into the gate structure GP14 to form the active areas FF25 and FF26.

As illustratively shown in FIG. 2F, the portion 100D further includes shallow trench isolations ST21-ST27 and gate end dielectrics GD21-GD23. The shallow trench isolations ST21-ST27 are interposed into the wells PW21, NW21 and PW22, and are arranged in order along the X direction. The shallow trench isolation ST22 is disposed between the active areas FF21 and FF22. The shallow trench isolation ST23 is disposed between the active areas FF22 and FF23. The shallow trench isolation ST24 is disposed between the active areas FF23 and FF24. The shallow trench isolation ST25 is disposed between the active areas FF24 and FF25. The shallow trench isolation ST26 is disposed between the active areas FF25 and FF26.

As illustratively shown in FIG. 2F, the gate end dielectrics GD21-GD23 are arranged in order along the X direction. The gate end dielectric GD21 is disposed on the shallow trench isolation ST21, and extends along the Z direction to contact the inter-layer dielectrics ILD1. The gate end dielectric GD23 is disposed on the shallow trench isolation ST27, and extends along the Z direction to contact the inter-layer dielectrics ILD1. The gate end dielectric GD22 is disposed on the shallow trench isolation ST24, and extends along the Z direction to contact the inter-layer dielectrics ILD1, to isolate the gate structures GP12 and GP14 from each other.

FIG. 2G is a circuit diagram of a semiconductor device 200G corresponding to the semiconductor device 100A shown in FIG. 1A, in accordance with some embodiments of the present disclosure. In some embodiments, the semiconductor device 200G includes multiple memory cell and multiple bit lines.

As illustratively shown in FIG. 2G, the semiconductor device 200G includes memory cells CL(1,1)-CL(4,4) and bit lines BL21-BL24, BLB21-BLB24. For i being a positive integer smaller than five, the memory cells CL(i,1)-CL(i,4) are coupled to the bit lines BL2i and BLB2i. The memory cells CL(i,1)-CL(i,4) are arranged in order along the Y direction, and the memory cells CL(1,i)-CL(4,i) are arranged in order along the X direction.

As illustratively shown in FIG. 2G, each of the memory cells CL(1,4) and CL(4,4) is configured to receive the word line signal WS21. Each of the memory cells CL(2,4) and CL(3,4) is configured to receive the word line signal WS22. Each of the memory cells CL(1,3) and CL(4,3) is configured to receive the word line signal WS23. Each of the memory cells CL(2,3) and CL(3,3) is configured to receive the word line signal WS24. Each of the memory cells CL(1,2) and CL(4,2) is configured to receive the word line signal WS25. Each of the memory cells CL(2,2) and CL(3,2) is configured to receive the word line signal WS26. Each of the memory cells CL(1,1) and CL(4,1) is configured to receive the word line signal WS27. Each of the memory cells CL(2,1) and CL(3,1) is configured to receive the word line signal WS28.

Referring to FIG. 2G and FIG. 1A, configurations of each of the memory cells CL(1,1)-CL(4,4) is similar with the memory cell 110A. For example, the memory cell CL(4,2) includes switches IS21 and IS22. The memory cell CL(3,2) includes switches IS23 and IS24. Each of the switches IS21 and IS23 corresponds to the switch IS11, and each of the switches IS22 and IS24 corresponds to the switch IS12.

Referring to FIG. 2G, FIG. 1C and FIG. 1D, adjacent two of the memory cells CL(1,1)-CL(4,4) are implemented by the memory cells 110C and 120C in some embodiments. For example, the memory cells CL(3,2) and CL(4,2) are implemented by the memory cells 110C and 120C, respectively.

In such example, control terminals of the switches IS21 and IS23 correspond to the gate structure GIS11, and control terminals of the switches IS22 and IS24 correspond to the gate structure GIS12. When the reference voltage signal CVDD is applied to the gate structure GIS11, each the switches IS21 and IS23 is turned off to isolate the memory cell CL(4,2) from the memory cell CL(4,3) and isolate the memory cell CL(3,2) from the memory cell CL(3,3). When the reference voltage signal CVDD is applied to the gate structure GIS12, each the switches IS22 and IS24 is turned off to isolate the memory cell CL(4,2) from the memory cell CL(4,1) and isolate the memory cell CL(3,2) from the memory cell CL(3,1).

Further referring to FIG. 1H, in the example described above, the conductive segment MW11 is configured to transmit the word line signal WS25 to the memory cell CL(4,2). The conductive segment MW12 is configured to transmit the word line signal WS26 to the memory cell CL(3,2). In some embodiments, the conductive segment MW11 extends to the memory cell CL(1,2) to transmit the word line signal WS25 to the memory cell CL(1,2), and the conductive segment MW12 extends to the memory cell CL(2,2) to transmit the word line signal WS26 to the memory cell CL(2,2).

Figure 2H:
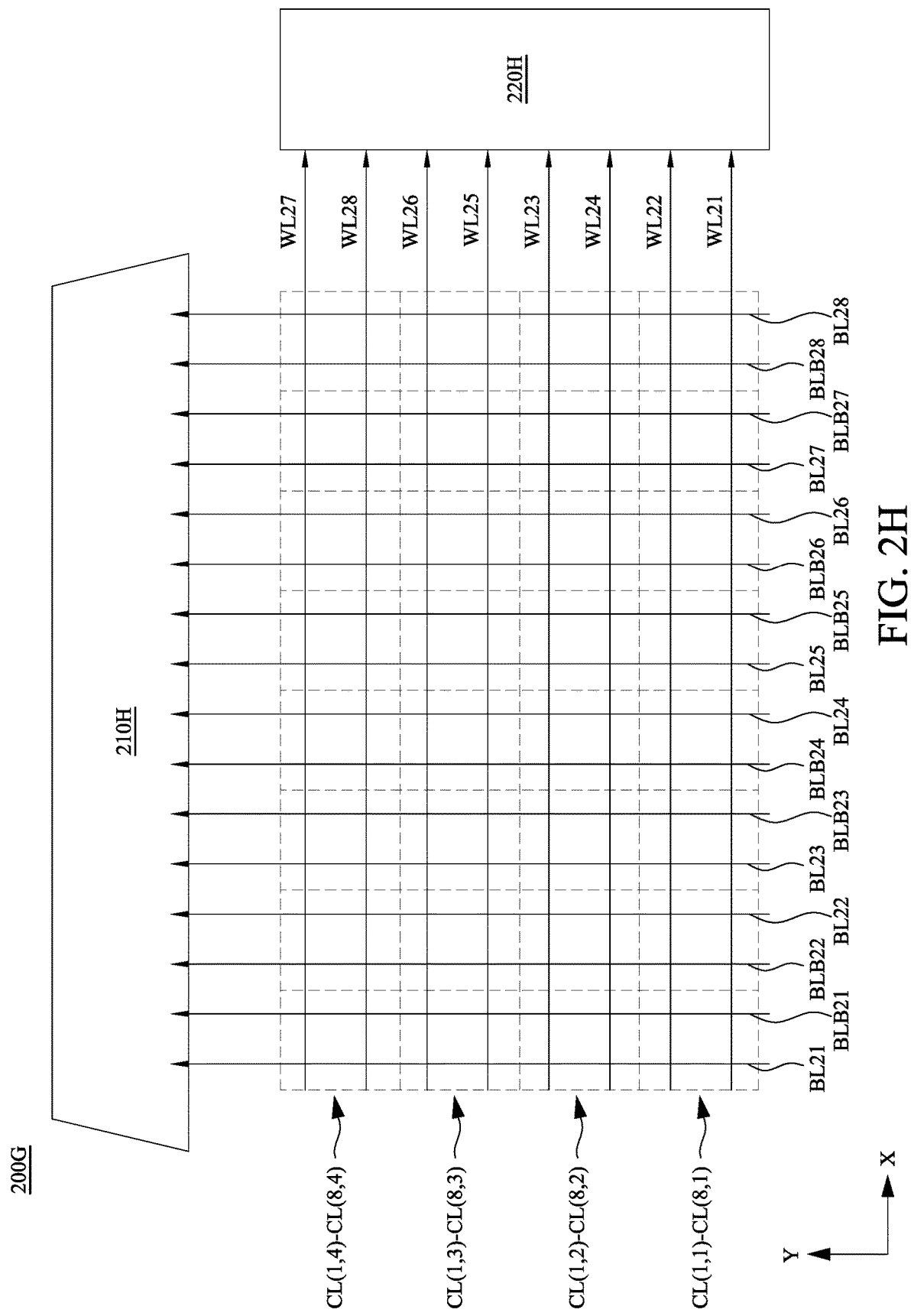
FIG. 2H is a schematic diagram of a semiconductor device shown in FIG. 2G, in accordance with some embodiments of the present disclosure.

FIG. 2H is a schematic diagram of a semiconductor device 200G shown in FIG. 2G, in accordance with some embodiments of the present disclosure. As illustratively shown in FIG. 2G, the semiconductor device 200G further includes a bit line circuit 210H, a word line circuit 220H, bit lines BL25-BL28, BLB25-BLB28, word lines WL21-WL28, and memory cells CL(5,1)-CL(8,4). In some embodiments, the bit line circuit 210H includes a column multiplexer (MUX), a sense amplifier and a write driver. The word line circuit 220H includes a word line decoder and a word line driver.

As illustratively shown in FIG. 2H, the bit lines BL21-BL28 and BLB21-BLB28 are coupled to the bit line circuit 210H, and extend along the Y direction. For j being a positive integer smaller than nine, the memory cells CL(j,1)-CL(j,4) are coupled to the bit lines BL2j and BLB2j, and are arranged in order along the Y direction. For i being a positive integer smaller than five, the memory cells CL(1,i)-CL(8,i) are arranged in order along the X direction.

As illustratively shown in FIG. 2H, the word lines WL21-WL28 are coupled to the word line circuit 220H, and extend along the X direction. The word lines WL21, WL22, WL24, WL23, WL25, WL26, WL28 and WL27 are arranged in order along the Y direction. The memory cells CL(1,1), CL(4,1), CL(5,1), CL(8,1) are coupled to the word line WL21. The memory cells CL(2,1), CL(3,1), CL(6,1), CL(7,1) are coupled to the word line WL22. The memory cells CL(1,2), CL(4,2), CL(5,2), CL(8,2) are coupled to the word line WL23. The memory cells CL(2,2), CL(3,2), CL(6,2), CL(7,2) are coupled to the word line WL24. The memory cells CL(1,3), CL(4,3), CL(5,3), CL(8,3) are coupled to the word line WL25. The memory cells CL(2,3), CL(3,3), CL(6,3), CL(7,3) are coupled to the word line WL26. The memory cells CL(1,4), CL(4,4), CL(5,4), CL(8,4) are coupled to the word line WL27. The memory cells CL(2,4), CL(3,4), CL(6,4), CL(7,4) are coupled to the word line WL28. Referring to FIG. 2G and FIG. 2H, in some embodiments, the word lines WL21-WL28 are configured to transmit the word line signals WS27, WS28, WS25, WS26, WS23, WS24, WS21 and WS22, respectively.

Referring to FIG. 2H, FIG. 1D and FIG. 1C, each of the memory cells CL(1,1)-CL(8,4) is implemented by one the memory cells 110C and 120C, and has a width of four contact poly pitches (CPP) along the Y direction. In which one CPP corresponds to a distance between two adjacent gate structures along the Y direction. For example, a distance between the gate structures GP13 and GP14 along the Y direction is approximately equal to one CPP.

In some approaches, a memory cell has a width of two CPP, and a bit line is coupled to eight memory cells which receive eight word line signals. As a result, a loading on the bit line is heavy.

Compared to the above approaches, in some embodiments of the present disclosure, the bit line BL21 is coupled to four memory cells CL(1,1)-CL(1,4), and the bit line BL22 is coupled to four memory cells CL(2,1)-CL(2,4), in which the memory cells CL(1,1)-CL(1,4) and CL(2,1)-CL(2,4) receive the word line signals WL21-WL28. Accordingly, loadings of the bit lines BL21 and BL22 are reduced, and extra areas of the semiconductor device 200G is not required by using structures of the memory cells 110C and 120C.

Figure 2I:
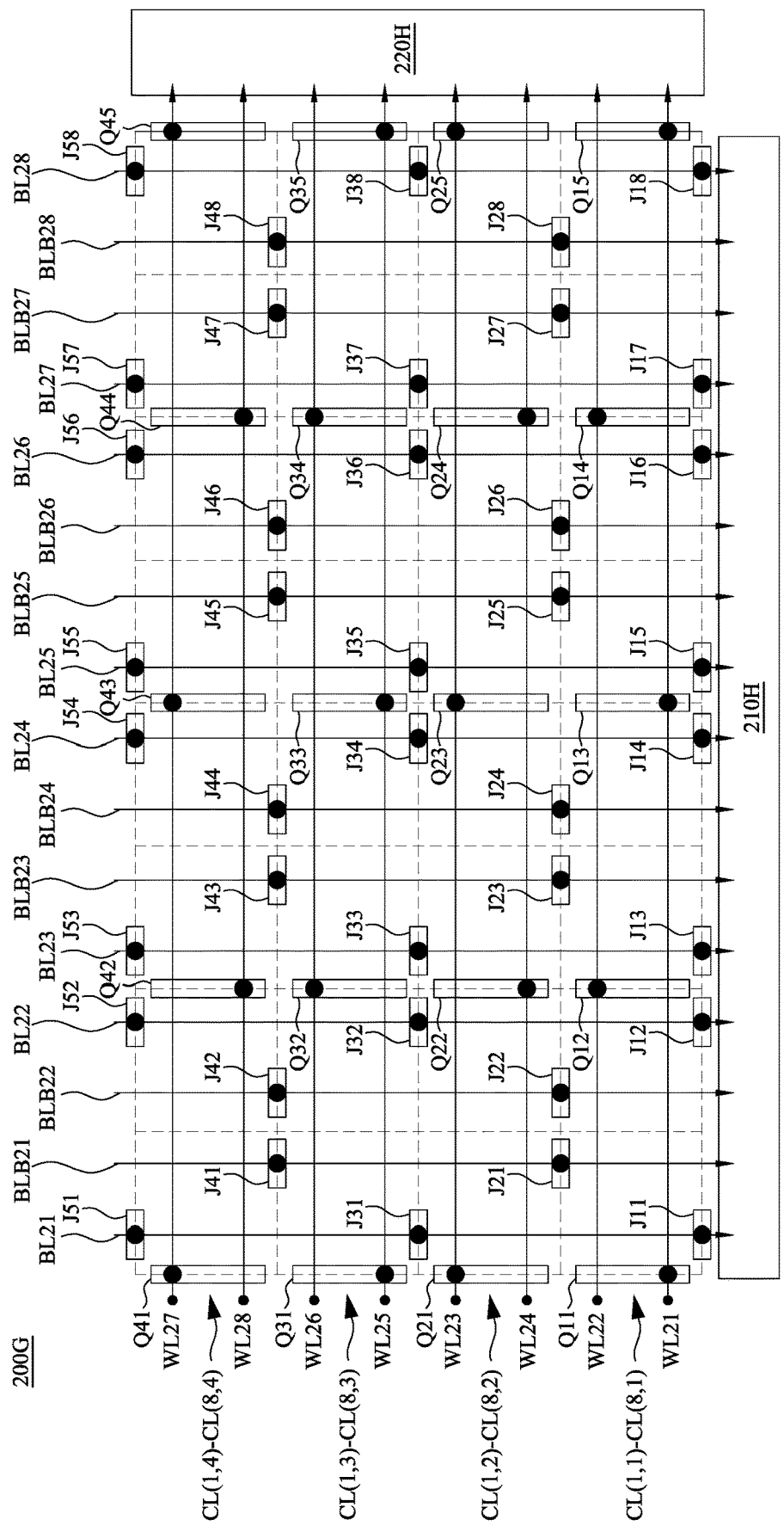
FIG. 2I is a schematic diagram of a semiconductor device shown in FIG. 2G, in accordance with some embodiments of the present disclosure.

FIG. 2I is a schematic diagram of a semiconductor device 200G shown in FIG. 2G, in accordance with some embodiments of the present disclosure. As illustratively shown in FIG. 2I, the semiconductor device 200G further includes conductive segments J11-J18, J21-J28, J31-J38, J41-J48, J51-J58, Q11-Q15, Q21-Q25, Q31-Q35 and Q41-Q45.

As illustratively shown in FIG. 2I, for i being a positive integer smaller than six and j being a positive integer smaller than nine, the conductive segments Ji1-Ji8 are arranged in order along the X direction, and the conductive segments J1j-J5j are arranged in order along the Y direction. For i being a positive integer smaller than five and j being a positive integer smaller than six, the conductive segments Qi1-Qi5 are arranged in order along the X direction, and the conductive segments Q1j-J4j are arranged in order along the Y direction.

In some embodiments, each of the conductive segments J11-J18, J21-J28, J31-J38, J41-J48, J51-J58, Q11-Q15, Q21-Q25, Q31-Q35 and Q41-Q45 couples a word line or a bit line to corresponding one of the memory cells CL(1,1)-CL(8,4) through a corresponding via.

As illustratively shown in FIG. 2I, for i being a positive integer smaller than nine, the conductive segment J1i couples the bit line BL2i to the memory cell CL(i,1), the conductive segment J2i couples the bit line BLB2i to the memory cells CL(i,1) and CL(i,2), the conductive segment J3i couples the bit line BL2i to the memory cells CL(i,3) and CL(i,2), the conductive segment J4i couples the bit line BLB2i to the memory cells CL(i,3) and CL(i,4), and the conductive segment J5i couples the bit line BL2i to the memory cell CL(i,4).

As illustratively shown in FIG. 2I, for i being a positive integer smaller than five and j being two times i, the conductive segment Qi1 couples the word line WL2(j-1) to the memory cell CL(1,i), the conductive segment Qi2 couples the word line WL2j to the memory cells CL(2,i) and CL(3,i), the conductive segment Qi3 couples the word line WL2(j-1) to the memory cells CL(4,i) and CL(5,i), the conductive segment Qi4 couples the word line WL2j to the memory cells CL(6,i) and CL(7,i), and the conductive segment Qi5 couples the word line WL2(j-1) to the memory cell CL(8,i).

Figure 3A:
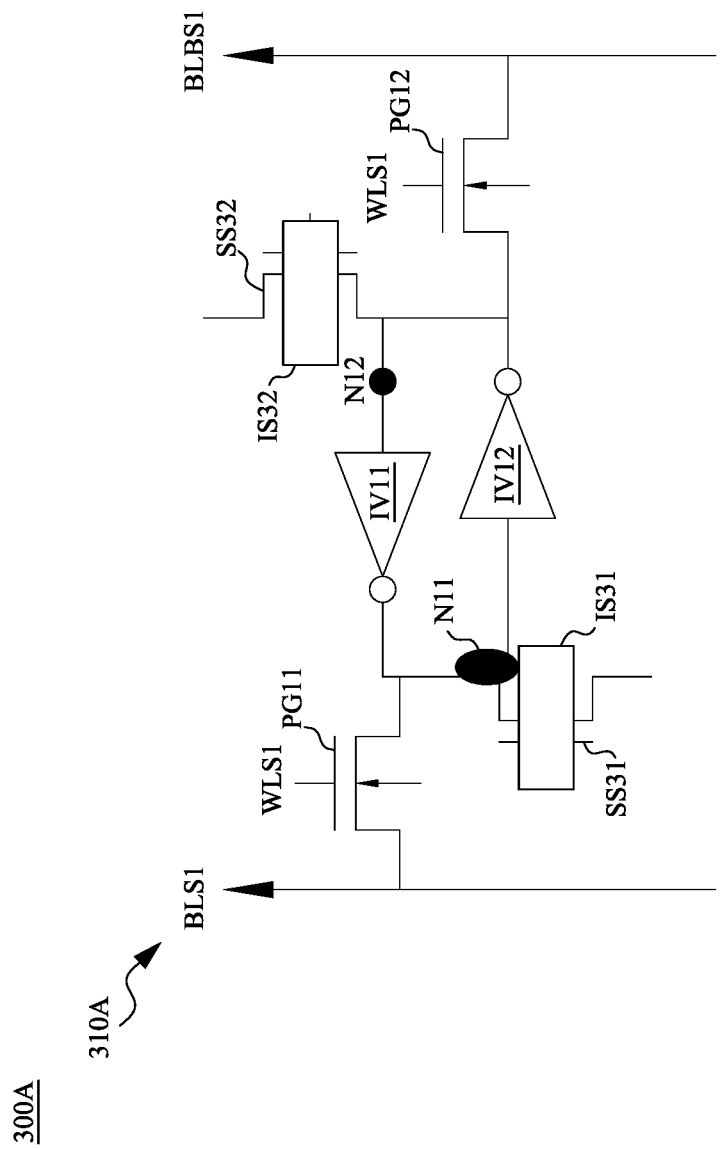
FIG. 3A is a circuit diagram of a semiconductor device corresponding to the semiconductor device shown in FIG. 1A, in accordance with some embodiments of the present disclosure.

FIG. 3A is a circuit diagram of a semiconductor device 300A corresponding to the semiconductor device 100A shown in FIG. 1A, in accordance with some embodiments of the present disclosure. As illustratively shown in FIG. 3A, semiconductor device 300A includes a memory cell 310A.

Referring to FIG. 3A and FIG. 1A, the semiconductor device 300A is an alternative embodiment of the semiconductor device 100A. FIG. 3A follows a similar labeling convention to that of FIG. 1A. For brevity, the discussion will focus more on differences between FIG. 3A and FIG. 1A than on similarities.

Referring to FIG. 3A and FIG. 1A, comparing with the memory cell 110A, the memory cell 310A includes switch structures SS31 and SS32 instead of the switches IS11 and IS12. The switch structure SS31 includes an isolation structure IS31. The switch structure SS32 includes an isolation structure IS32.

As illustratively shown in FIG. 3A, a first terminal of the switch structure SS31 is coupled to the node N11. The isolation structure IS31 is configured to isolate the first terminal of the switch structure SS31 from a second terminal of the switch structure SS31. A first terminal of the switch structure SS32 is coupled to the node N12. The isolation structure IS32 is configured to isolate the first terminal of the switch structure SS32 from a second terminal of the switch structure SS32.

Figure 3B:
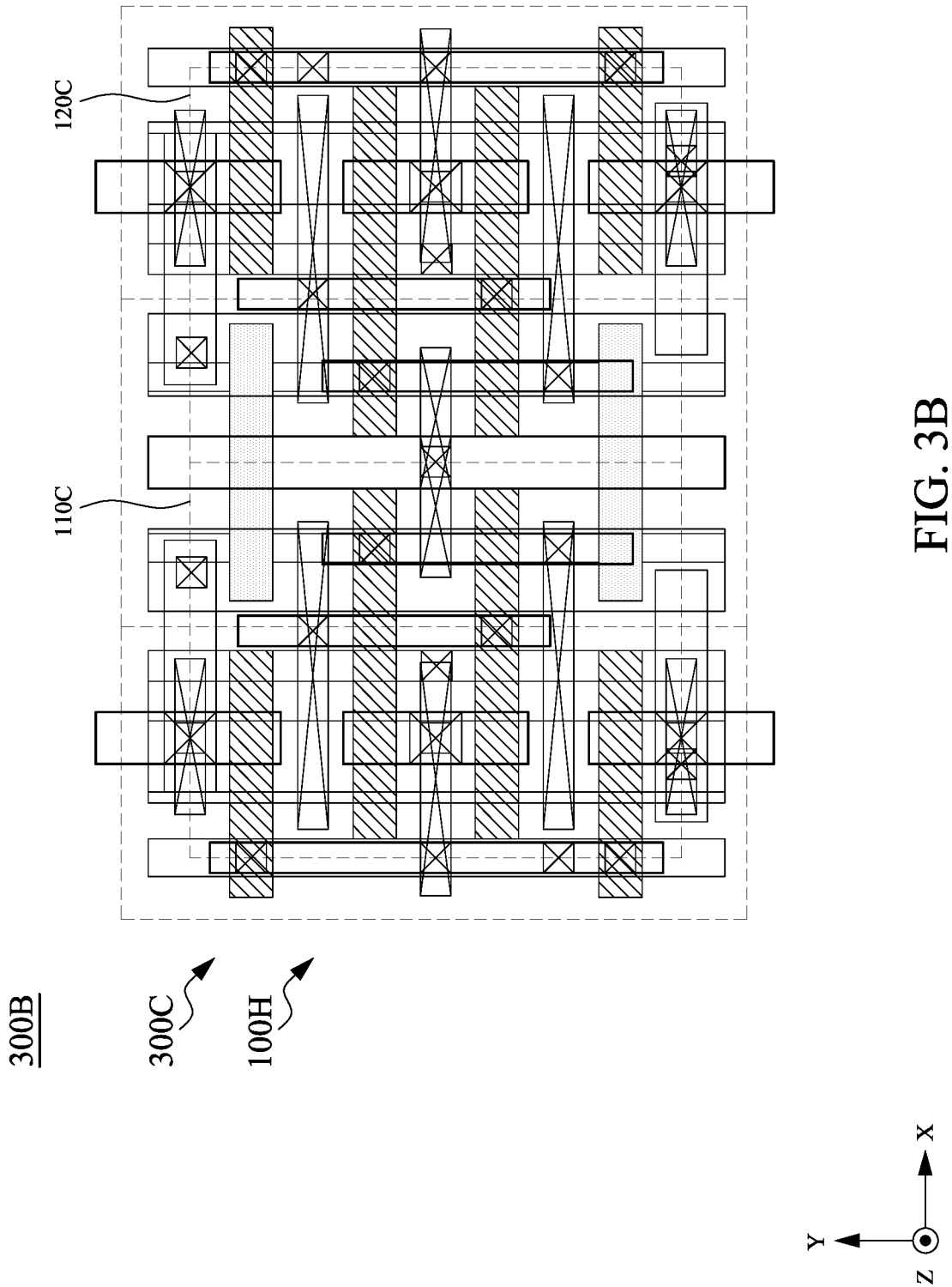
FIG. 3B is a layout diagram of a semiconductor device corresponding to the semiconductor device shown in FIG. 3A, in accordance with some embodiments of the present disclosure.

FIG. 3B is a layout diagram of a semiconductor device 300B corresponding to the semiconductor device 300A shown in FIG. 3A, in accordance with some embodiments of the present disclosure. As illustratively shown in FIG. 3B, the semiconductor device 300B includes portions 300C and 100H. The portions 300C and 100H are arranged in order along the Z direction which points out from the paper. The portion 100H is disposed on and contacts with the portion 300C. Details of the portion 100H is described above with embodiments associated with FIG. 1H. Further details of the portion 300C are described below with embodiments associated with FIG. 3C.

Figure 3C:
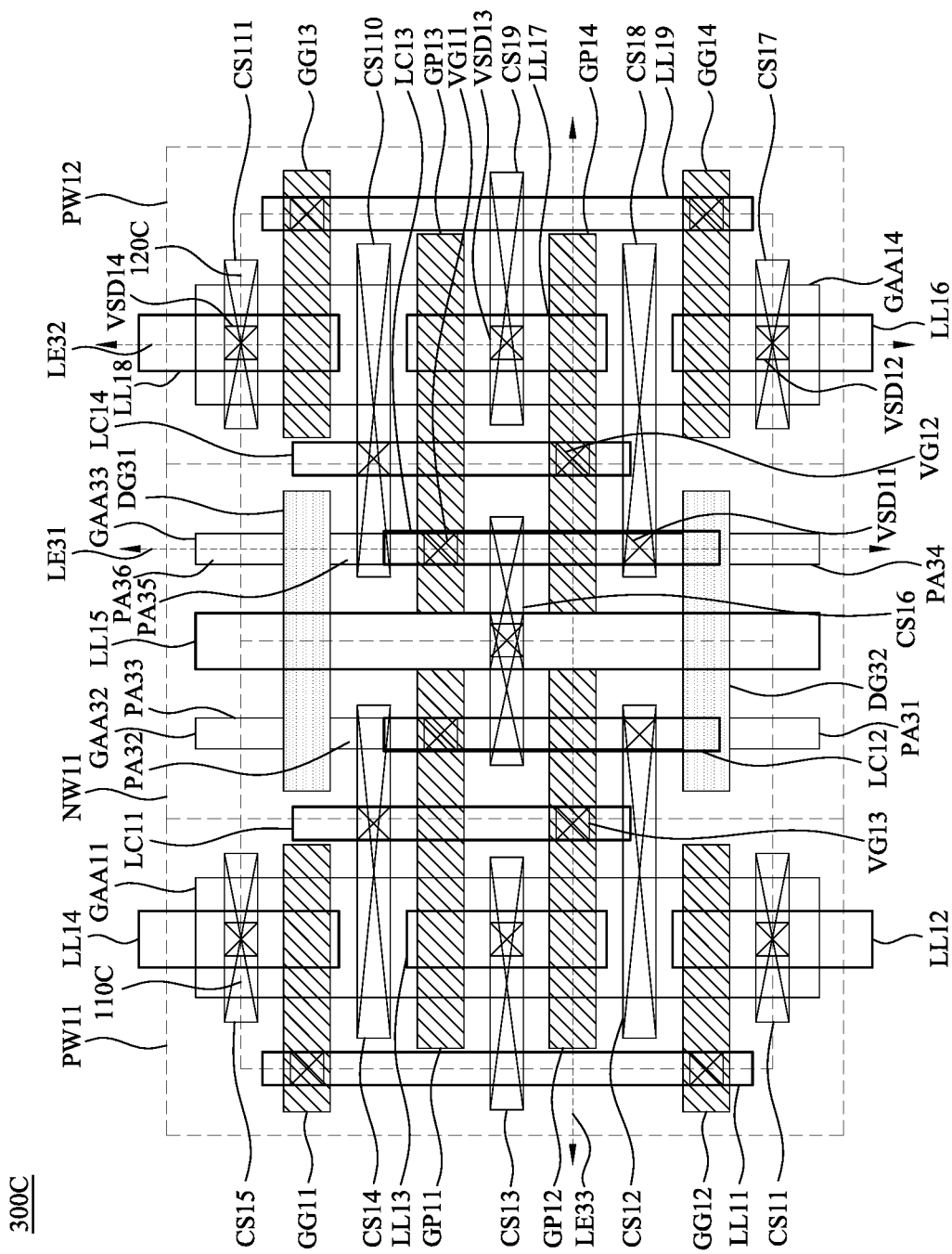
FIG. 3C is a layout diagram of a portion of the semiconductor device shown in FIG. 3B, in accordance with some embodiments of the present disclosure.

FIG. 3C is a layout diagram of the portion 300C of the semiconductor device 300B shown in FIG. 3B, in accordance with some embodiments of the present disclosure. Referring to FIG. 3C and FIG. 1D, the portion 300C is an alternative embodiment of the portion 100D. FIG. 3C follows a similar labeling convention to that of FIG. 1D. For brevity, the discussion will focus more on differences between FIG. 3C and FIG. 1D than on similarities.

Referring to FIG. FIG. 3C and FIG. 1D, comparing with the portion 100D, the portion 300C includes active areas GAA32, GAA33 and isolation structures DG31, DG32 instead of the active areas GAA12, GAA13 and the gate structures GIS11, GIS12. As illustratively shown in FIG. 3C, each of the isolation structures DG31 and DG32 extends along the X direction. Each of the active areas GAA32 and GAA33 extends along the Y direction. The active area GAA32 includes portions PA31-PA33 arranged in order along the Y direction. The active area GAA33 includes portions PA34-PA36 arranged in order along the Y direction.

As illustratively shown in FIG. 3C, the gate structures GP11 and GP12 are disposed on the portion PA32. The gate structures GP13 and GP14 are disposed on the portion PA35. The isolation structure DG31 is aligned with the gate structures GG11 and GG13, is interposed into each of the active areas GAA32 and GAA33, to isolate the portion PA33 from the portion PA32, and isolate the portion PA36 from the portion PA35. The isolation structure DG32 is aligned with the gate structures GG12 and GG14, is interposed into each of the active areas GAA32 and GAA33, to isolate the portion PA31 from the portion PA32, and isolate the portion PA34 from the portion PA35.

In some embodiments, the portion PA32 and the gate structures GP11, GP12 form a GAA structure. The portion PA35 and the gate structures GP11, GP12 form a GAA structure. In some embodiments, each of the isolation structures DG31 and DG32 is implemented by dielectric gates including one or more layer with various dielectric materials.

Referring to FIG. 3C and FIG. 3A, in some embodiments, the switch structures SS31 and SS32 are implemented by the active area GAA32 and the isolation structures DG31, DG32. In such embodiments, the isolation structures IS31 and IS32 correspond to the isolation structures DG31 and DG32, respectively. The nodes N11 and N12 correspond to the portion PA32. The second terminals of the switch structures SS31 and SS32 correspond to the portions PA33 and PA31, respectively.

Referring to FIG. 3C and FIG. 3A, in some embodiments, the switch structures SS31 and SS32 are implemented by the active area GAA33 and the isolation structures DG31, DG32. In such embodiments, the isolation structures IS31 and IS32 correspond to the isolation structures DG31 and DG32, respectively. The nodes N11 and N12 correspond to the portion PA35. The second terminals of the switch structures SS31 and SS32 correspond to the portions PA36 and PA34, respectively.

Figure 3D:
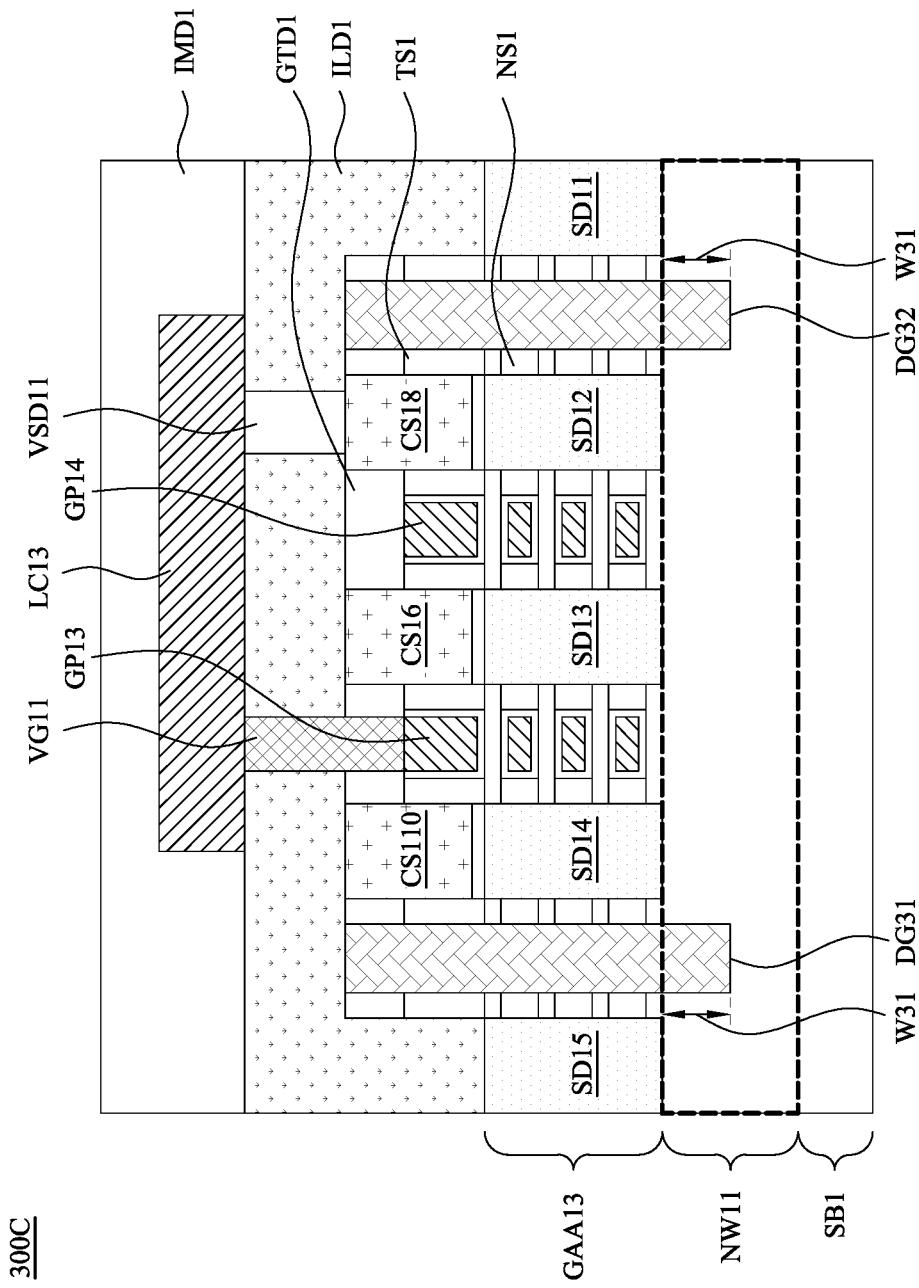
FIG. 3D is a cross section diagram of the portion along a line shown in FIG. 3C, in accordance with some embodiments of the present disclosure.

FIG. 3D is a cross section diagram of the portion 300C along the line LE31 shown in FIG. 3C, in accordance with some embodiments of the present disclosure. The X direction points into the paper in FIG. 3D. Referring to FIG. 3D and FIG. 1E, the cross section diagrams of the portions 300C and 100D are similar with each other. Therefore, some descriptions are not repeated for brevity.

As illustratively shown in FIG. 3D, the isolation structure DG31 is disposed between the source/drain regions SD14 and SD15, extends along the Z direction, contacts with the inter-layer dielectrics ILD1, and interposed into the well NW11 by a depth W31. Alternatively stated, a lower end of the isolation structure DG31 is located in the well NW11, and is apart from an upper surface of the well NW11 by the depth W31 along the Z direction. In some embodiments, the depth W31 is approximately in a range of 15-150 nanometers.

As illustratively shown in FIG. 3D, the isolation structure DG32 is disposed between the source/drain regions SD11 and SD12, extends along the Z direction, contacts with the inter-layer dielectrics ILD1, and interposed into the well NW11 by the depth W31. Alternatively stated, a lower end of the isolation structure DG32 is located in the well NW11, and is apart from an upper surface of the well NW11 by the depth W31 along the Z direction.

Referring to FIG. 3D and FIG. 1E, in some embodiments, the gate structures GIS11 and GIS12 are removed from the portion 100D, and dielectric materials are filled into positions of the gate structures GIS11 and GIS12, to form the isolation structures DG31 and DG32. Accordingly, the portion 300C is formed by the portion 100D. In some embodiments a width of each of the isolation structures DG31 and DG32 along the Y direction is approximately equal to a width of each of the gate structures GIS11 and GIS12, GP13 and GP14 along the Y direction. Each of a distance between the isolation structure DG31 and the gate structure GP13 and a distance between the isolation structure DG32 and the gate structure GP14 is approximately equal to a distance between the gate structures GP13 and GP14.

Figure 4A:
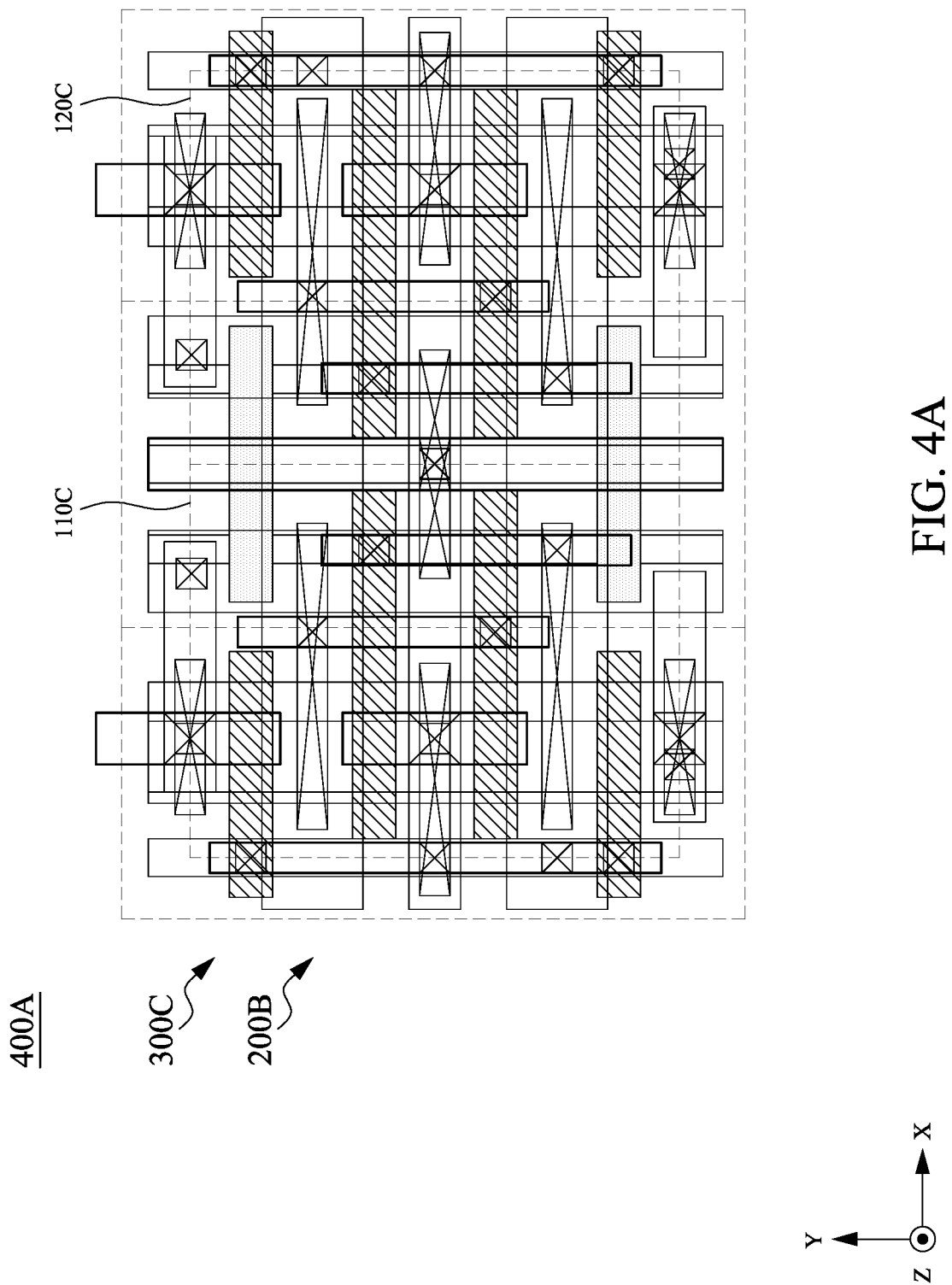
FIG. 4A is a layout diagram of a semiconductor device corresponding to the semiconductor device shown in FIG. 3B, in accordance with some embodiments of the present disclosure.

FIG. 4A is a layout diagram of a semiconductor device 400A corresponding to the semiconductor device 300B shown in FIG. 3B, in accordance with some embodiments of the present disclosure. Referring to FIG. 4A and FIG. 3B, the semiconductor device 400A is an alternative embodiment of the semiconductor device 300B. Comparing with the semiconductor device 300B, the semiconductor device 400A includes a portion 200B instead of the portion 100H. The portion 200B is disposed on and contacts with the portion 300C. The memory cells 110C and 120C are formed by the portions 300C and 200B. Details of the portions 200B and 300C are described above with embodiments associated with FIG. 2B and FIG. 3C, respectively.

Figure 4B:
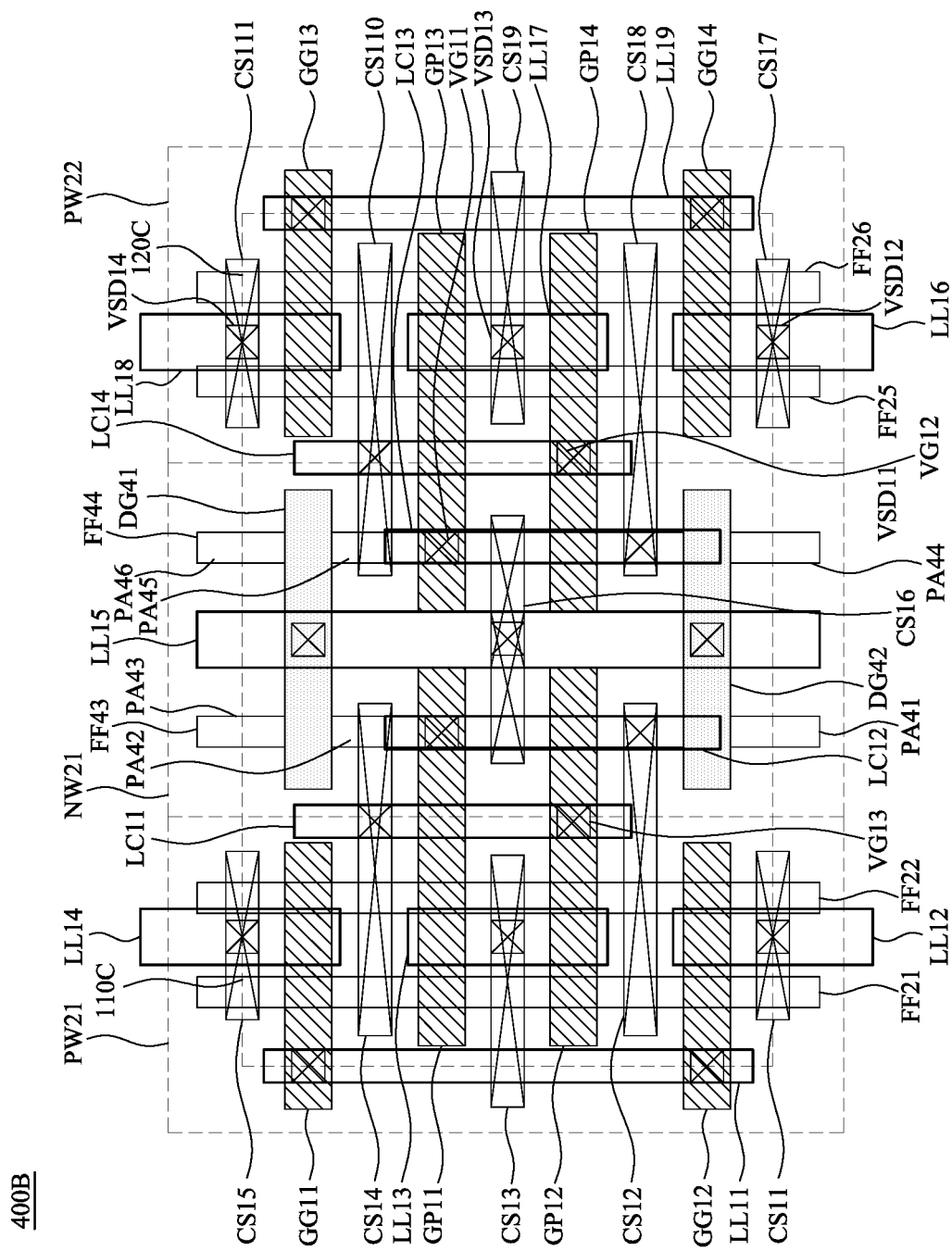
FIG. 4B is a layout diagram of a portion corresponding to the portion shown in FIG. 2C, in accordance with some embodiments of the present disclosure.
Figure 4B:
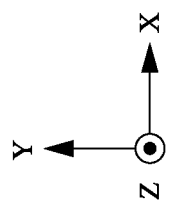

FIG. 4B is a layout diagram of a portion 400B corresponding to the portion 200C shown in FIG. 2C, in accordance with some embodiments of the present disclosure. Referring to FIG. 2C and FIG. 4B, the portion 400B is an alternative embodiment of the portion 200C. FIG. 4B follows a similar labeling convention to that of FIG. 2C. For brevity, the discussion will focus more on differences between FIG. 4B and FIG. 2C than on similarities.

Referring to FIG. FIG. 4B and FIG. 2C, comparing with the portion 200C, the portion 400B includes active areas FF43, FF44 and isolation structures DG41, DG42 instead of the active areas FF43, FF44 and the gate structures GIS11, GIS12. As illustratively shown in FIG. 4B, each of the isolation structures DG41 and DG42 extends along the X direction. Each of the active areas FF43 and FF44 extends along the Y direction. The active area FF43 includes portions PA41-PA43 arranged in order along the Y direction. The active area FF44 includes portions PA44-PA46 arranged in order along the Y direction.

As illustratively shown in FIG. 4B, the gate structures GP11 and GP12 are disposed on the portion PA42. The gate structures GP13 and GP14 are disposed on the portion PA45. The isolation structure DG43 is interposed into each of the active areas FF43 and FF44, to isolate the portion PA43 from the portion PA42, and isolate the portion PA46 from the portion PA45. The isolation structure DG42 is interposed into each of the active areas FF43 and FF44, to isolate the portion PA41 from the portion PA42, and isolate the portion PA44 from the portion PA45.

In some embodiments, the portion PA42 and the gate structures GP11, GP12 form a FinFET structure. The portion PA45 and the gate structures GP11, GP12 form a FinFET structure. In some embodiments, each of the isolation structures DG41 and DG42 is implemented by dielectric gates including one or more layer with various dielectric materials.

Referring to FIG. 4B and FIG. 3A, in some embodiments, the switch structures SS31 and SS32 are implemented by the active area FF43 and the isolation structures DG41, DG42. In such embodiments, the isolation structures IS31 and IS32 correspond to the isolation structures DG41 and DG42, respectively. The nodes N11 and N12 correspond to the portion PA42. The second terminals of the switch structures SS31 and SS32 correspond to the portions PA43 and PA41, respectively.

Referring to FIG. 4B and FIG. 3A, in some embodiments, the switch structures SS31 and SS32 are implemented by the active area FF44 and the isolation structures DG41, DG42. In such embodiments, the isolation structures IS31 and IS32 correspond to the isolation structures DG41 and DG42, respectively. The nodes N11 and N12 correspond to the portion PA45. The second terminals of the switch structures SS31 and SS32 correspond to the portions PA46 and PA44, respectively.

Figure 4C:
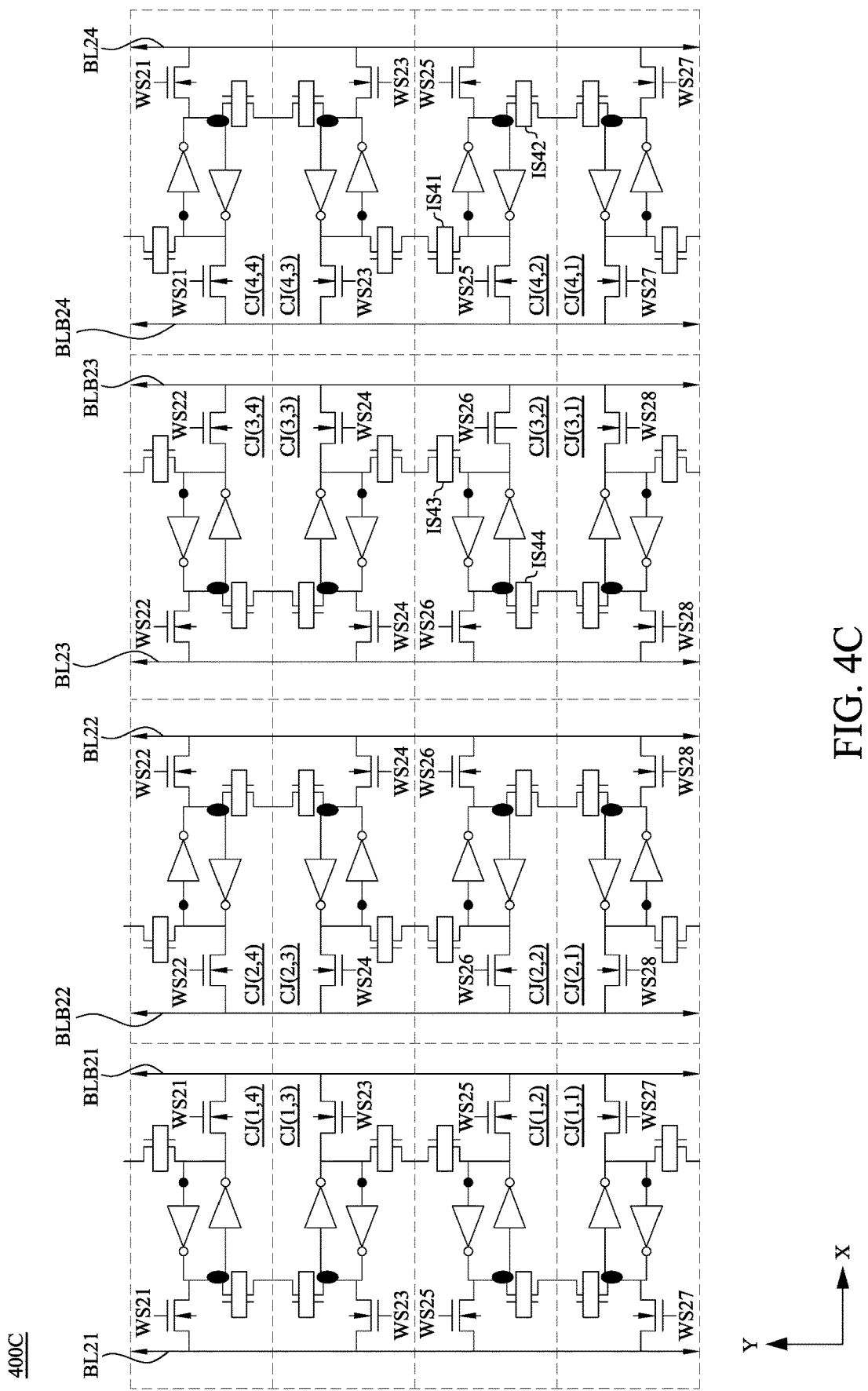
FIG. 4C is a circuit diagram of a semiconductor device corresponding to the semiconductor device shown in FIG. 2G, in accordance with some embodiments of the present disclosure.

FIG. 4C is a circuit diagram of a semiconductor device 400C corresponding to the semiconductor device 200G shown in FIG. 2G, in accordance with some embodiments of the present disclosure. As illustratively shown in FIG. 4C, the semiconductor device 400C includes memory cells CJ(1, 1)-CJ(4,4). Referring to FIG. 4C and FIG. 2G, arrangements and connections with the word line signals WS21-WS28 and the bit lines BL21-BL24, BLB21-BLB24 of the memory cells CJ(1,1)-CJ(4,4) are similar with the arrangements and connections with the word line signals WS21-WS28 and the bit lines BL21-BL24, BLB21-BLB24 of the memory cells CL(1,1)-CL(4,4). Therefore, some descriptions are not repeated for brevity.

Referring to FIG. 4C and FIG. 3A, configurations of each of the memory cells CJ(1,1)-CJ(4,4) is similar with the memory cell 310A. For example, the memory cell CJ(4,2) includes isolation structures IS41 and IS42. The memory cell CJ(3,2) includes isolation structures IS43 and IS44. Each of the isolation structures IS41 and IS43 corresponds to the isolation structure IS31, and each of the isolation structures IS42 and IS44 corresponds to the isolation structure IS32.

Referring to FIG. 4C, FIG. 3B and FIG. 3C, adjacent two of the memory cells CJ(1,1)-CJ(4,4) are implemented by the memory cells 110C and 120C in some embodiments. For example, the memory cells CJ(3,2) and CJ(4,2) are implemented by the memory cells 110C and 120C, respectively.

In such example, the isolation structures IS41 and IS43 correspond to the isolation structure DG31, and the isolation structures IS42 and IS44 correspond to the isolation structure DG32. The isolation structure DG31 isolates the memory cell CJ(4,2) from the memory cell CJ(4,3) and isolates the memory cell CJ(3,2) from the memory cell CJ(3,3). The isolation structure DG32 isolates the memory cell CJ(4,2) from the memory cell CJ(4,1) and isolates the memory cell CJ(3,2) from the memory cell CJ(3,1).

Figure 5A:
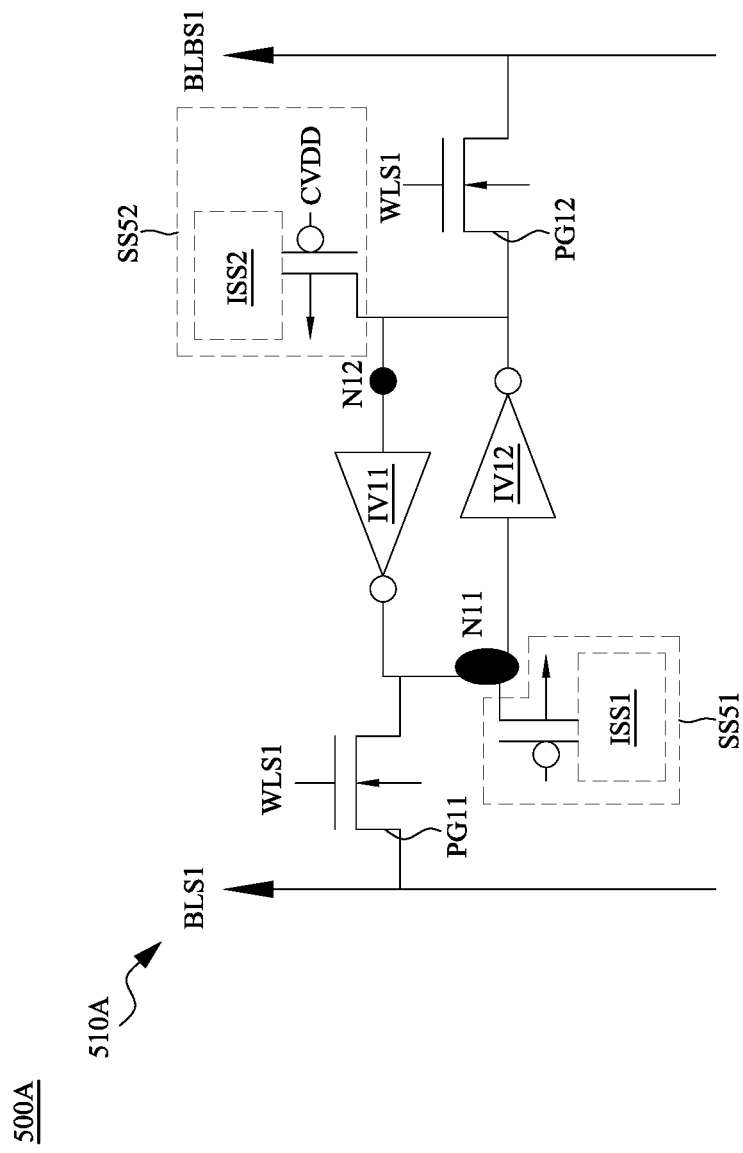
FIG. 5A is a circuit diagram of a semiconductor device corresponding to the semiconductor device shown in FIG. 1A, in accordance with some embodiments of the present disclosure.

FIG. 5A is a circuit diagram of a semiconductor device 500A corresponding to the semiconductor device 100A shown in FIG. 1A, in accordance with some embodiments of the present disclosure. As illustratively shown in FIG. 5A, semiconductor device 500A includes a memory cell 510A.

Referring to FIG. 5A and FIG. 1A, the semiconductor device 500A is an alternative embodiment of the semiconductor device 100A. FIG. 5A follows a similar labeling convention to that of FIG. 1A. For brevity, the discussion will focus more on differences between FIG. 5A and FIG. 1A than on similarities.

Referring to FIG. 5A and FIG. 1A, comparing with the memory cell 110A, the memory cell 510A includes switch structures SS51 and SS52 instead of the switches IS11 and IS12. The switch structure SS51 includes an isolation structure ISS1. The switch structure SS52 includes an isolation structure ISS2.

As illustratively shown in FIG. 5A, a terminal of the switch structure SS51 is coupled to the node N11. A control terminal of the switch structure SS51 is floated. The isolation structure ISS1 is configured to isolate the switch structure SS51 from another memory cell adjacent to the memory cell 510A. A first terminal of the switch structure SS52 is coupled to the node N12. A control terminal of the switch structure SS52 is floated. The isolation structure ISS2 is configured to isolate the switch structure SS52 from another memory cell adjacent to the memory cell 510A.

Figure 5B:
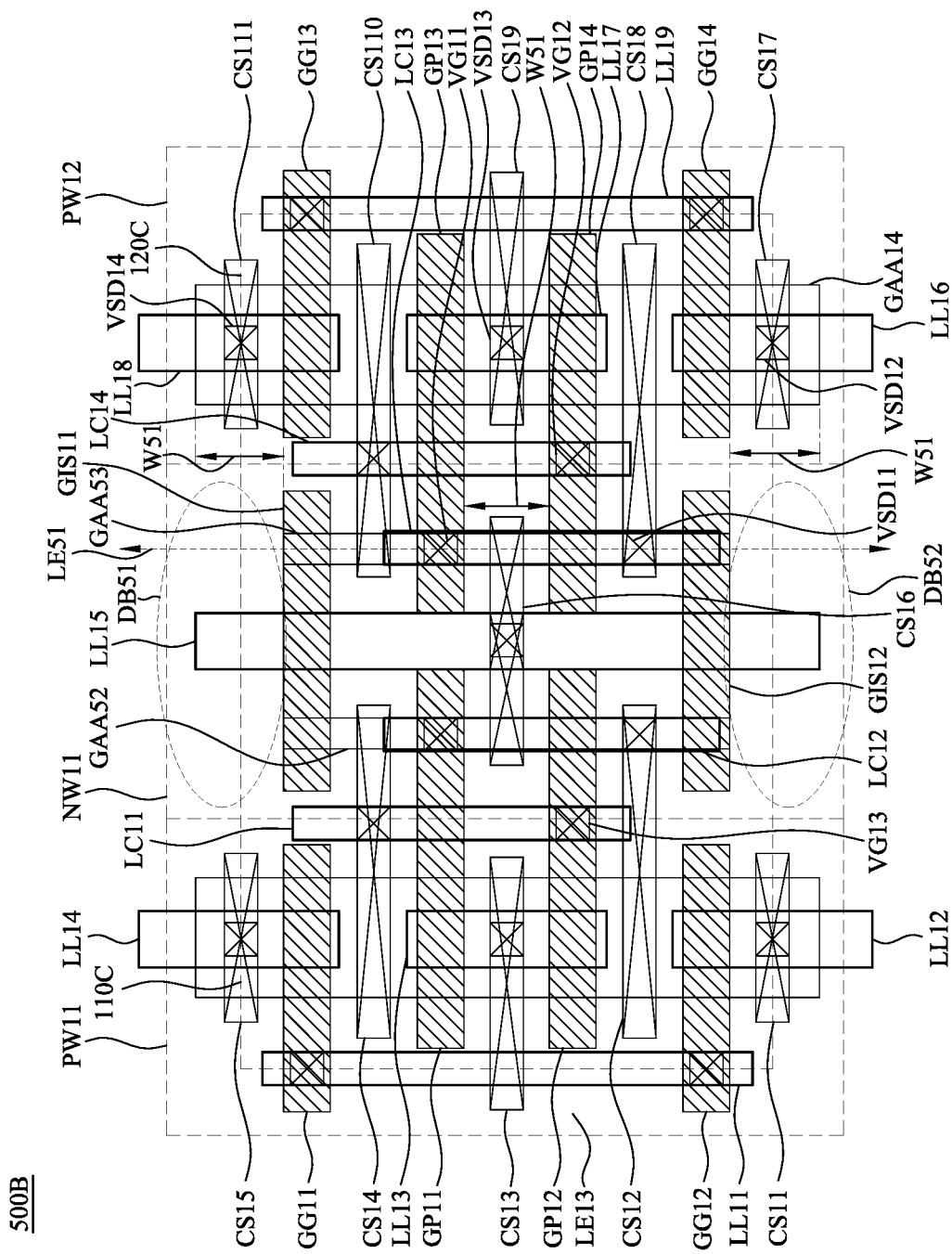
FIG. 5B is a layout diagram of a portion corresponding to the semiconductor device shown in FIG. 5A, in accordance with some embodiments of the present disclosure.

FIG. 5B is a layout diagram of a portion 500B corresponding to the semiconductor device 500A shown in FIG. 5A, in accordance with some embodiments of the present disclosure. Referring to FIG. 5B and FIG. 5A, at least one part of the semiconductor device 500A is implemented by the portion 500B. For example, the memory cell 510A is implemented by one of the memory cells 110C and 120C.

Referring to FIG. 5B and FIG. 1D, the portion 500B is an alternative embodiment of the portion 100D. FIG. 5B follows a similar labeling convention to that of FIG. 1D. For brevity, the discussion will focus more on differences between FIG. 5B and FIG. 1D than on similarities. Comparing with the portion 100D, the portion 500B includes active areas GAA52, GAA53 and cut regions DB51, DB52 instead of the active areas GAA12, GAA13.

As illustratively shown in FIG. 5B, each of the active areas GAA52 and GAA53 extends along the Y direction. Along the Y direction, the cut regions DB51 and DB52 are positioned at opposite ends of the active area GAA52, respectively, and are positioned at opposite ends of the active area GAA53, respectively.

In some embodiments, parts of active areas in the cut regions DB51, DB52 are removed to form the active areas GAA52 and GAA53. For example, referring to FIG. 1D and FIG. 5B, the portions PA11 and PA13 are removed according to the cut regions DB51 and DB52, respectively, to form the active area GAA52. The portions PA14 and PA16 are removed according to the cut regions DB51 and DB52, respectively, to form the active area GAA53. The active areas GAA52 and GAA53 correspond to the portions PA12 and PA15, respectively.

As illustratively shown in FIG. 5B, the gate structures GP11 and GP12 are disposed on the active area GAA52. The gate structures GP13 and GP14 are disposed on the active area GAA53. Lengths of the active areas GAA52 and GAA53 are shorter than lengths of the active areas GAA11 and GAA14 along the Y direction. Each of first ends of active areas GAA52 and GAA53 is apart from each of first ends of the active areas GAA11 and GAA14 by a distance W51 along the Y direction. Each of second ends of active areas GAA52 and GAA53 is apart from each of second ends of the active areas GAA11 and GAA14 by the distance W51 along the Y direction. The distance W51 corresponds to a space between two adjacent gate structures. For example, the gate structures GP13 and GP14 are separated from each other by the distance W51.

Referring to FIG. 5B and FIG. 5A, in some embodiments, the switch structures SS51 and SS52 are implemented by the active area GAA52 and the cut regions DB51, DB52. In such embodiments, the isolation structures ISS1 and ISS2 correspond to the cut regions DB51 and DB52, respectively. The gate structures GIS11 and GIS12 correspond to the control terminals of the switch structures SS51 and SS52, and are floated. The active area GAA52 corresponds to the nodes N11 and N12.

Referring to FIG. 5B and FIG. 5A, in some embodiments, the switch structures SS51 and SS52 are implemented by the active area GAA53 and the cut regions DB51, DB52. In such embodiments, the isolation structures ISS1 and ISS2 correspond to the cut regions DB51 and DB52, respectively. The gate structures GIS11 and GIS12 correspond to the control terminals of the switch structures SS51 and SS52, and are floated and referred to as dummy gate structures. The active area GAA53 corresponds to the nodes N11 and N12.

Referring to FIG. 5B, FIG. 4A, FIG. 3B, FIG. 2A and FIG. 1C, in some alternative embodiments, for semiconductors 400A, 300B, 200A and 100C, each of the portions 100D, 200B and 300C is replaced by the portion 500B, to form structures corresponding to the memory cell 510A shown in FIG. 5A.

Figure 5C:
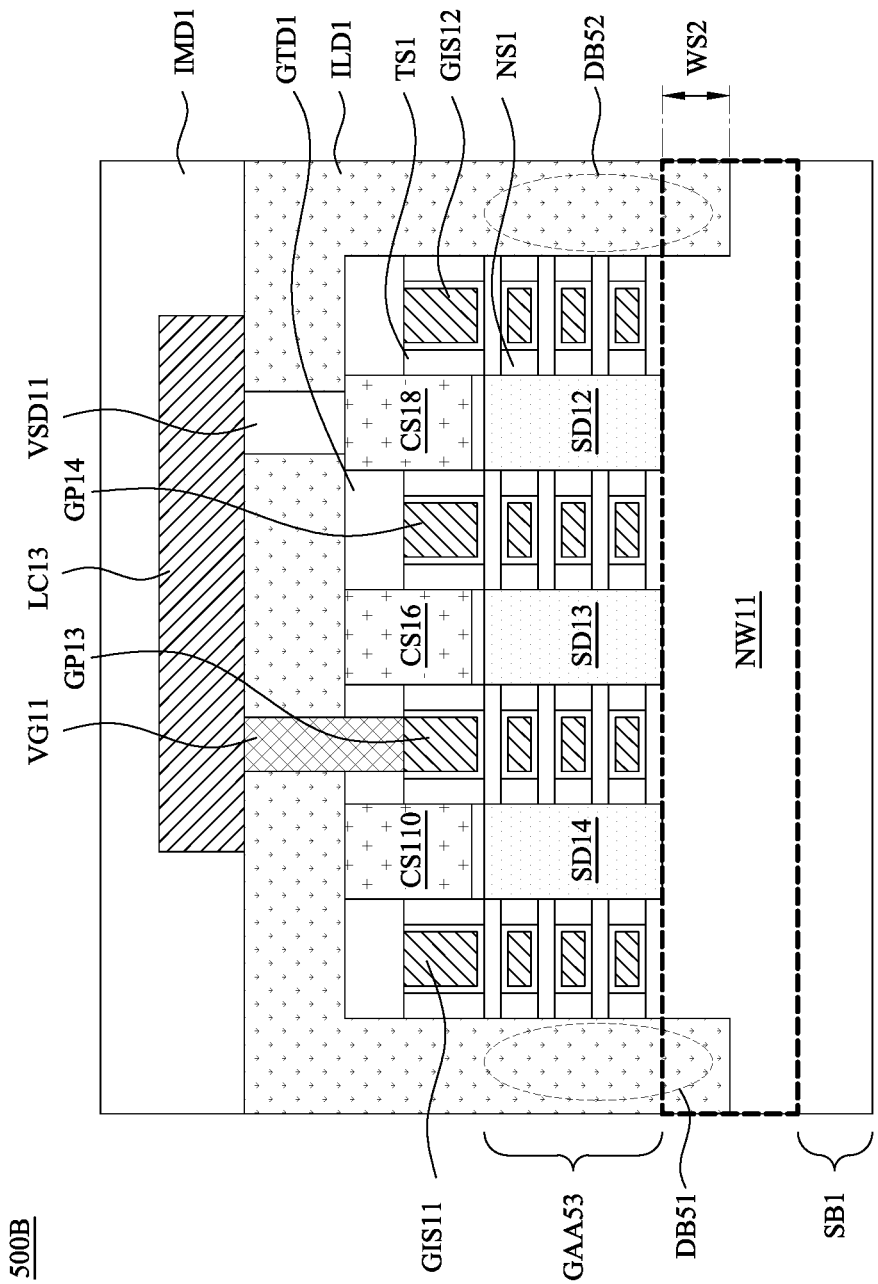
FIG. 5C is a cross section diagram of the portion along a line shown in FIG. 5B, in accordance with some embodiments of the present disclosure.

FIG. 5C is a cross section diagram of the portion 500B along the line LE51 shown in FIG. 5B, in accordance with some embodiments of the present disclosure. The X direction points into the paper in FIG. 5C. Referring to FIG. 5C and FIG. 1E, the cross section diagrams of the portions 500B and 100D are similar with each other. Therefore, some descriptions are not repeated for brevity. Comparing with the portion 100D, the source/drain regions SD11, SD15 and parts of the well NW11 are removed according to the cut regions DB51 and DB52.

As illustratively shown in FIG. 5C, the inter-layer dielectrics ILD1 is interposed into the well NW11 by a depth W51 along the Z direction at the positions of the cut regions DB51 and DB52. Alternatively stated, lower ends of the inter-layer dielectrics ILD1 is located in the well NW11, and is apart from the upper surface of the well NW11 by the depth WS2 along the Z direction. In some embodiments, the depth WS2 is approximately in a range of 15-150 nanometers.

Figure 6A:
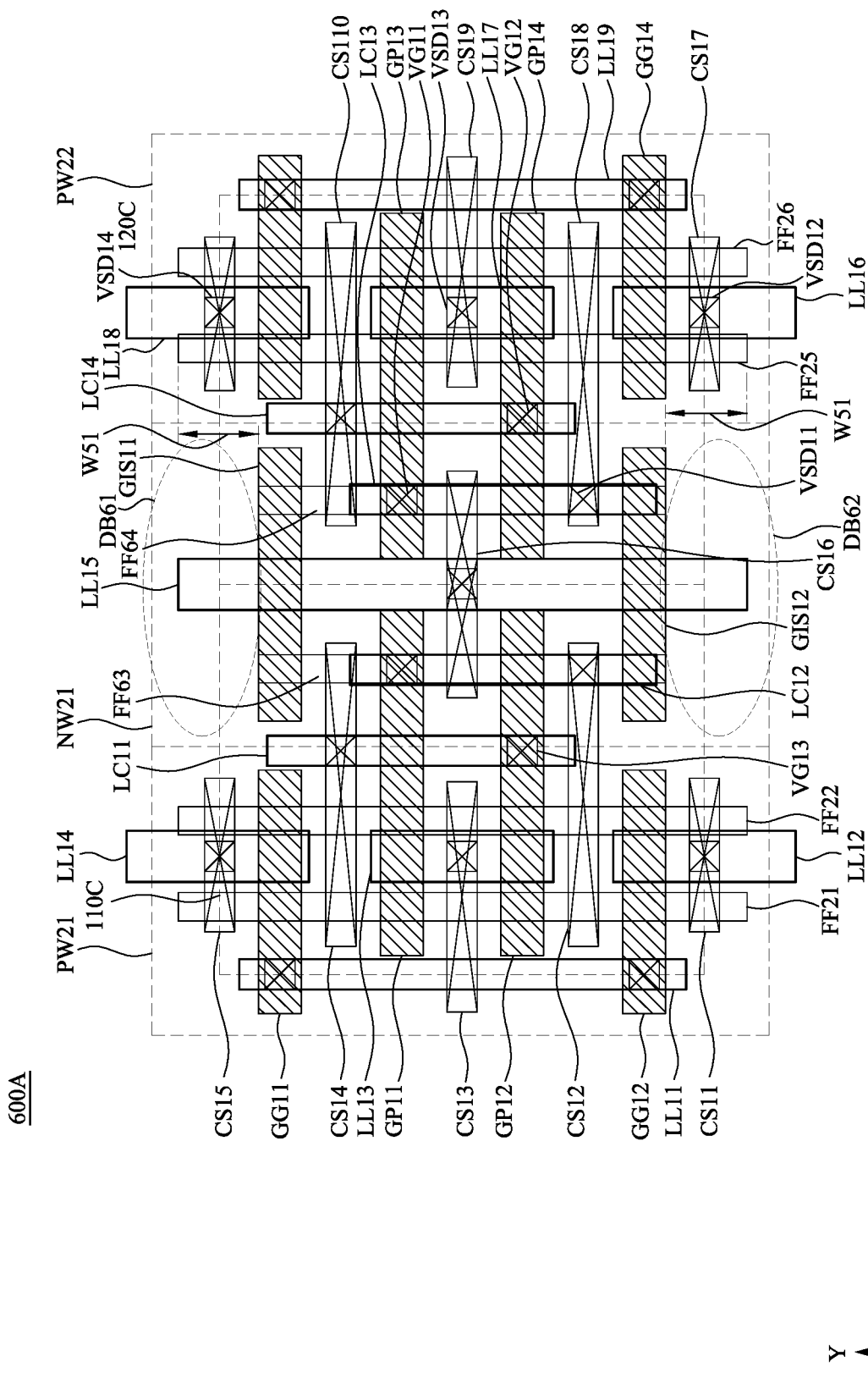
FIG. 6A is a layout diagram of a portion corresponding to the semiconductor device 500A shown in FIG. 5A, in accordance with some embodiments of the present disclosure.

FIG. 6A is a layout diagram of a portion 600A corresponding to the semiconductor device 500A shown in FIG. 5A, in accordance with some embodiments of the present disclosure. Referring to FIG. 6A and FIG. 5A, at least one part of the semiconductor device 500A is implemented by the portion 600A. For example, the memory cell 510A is implemented by one of the memory cells 110C and 120C.

Referring to FIG. 6A and FIG. 2C, the portion 600A is an alternative embodiment of the portion 200C. FIG. 6A follows a similar labeling convention to that of FIG. 2C. For brevity, the discussion will focus more on differences between FIG. 6A and FIG. 2C than on similarities. Comparing with the portion 200C, the portion 600A includes active areas FF63, FF64 and cut regions DB61, DB62 instead of the active areas FF23 and FF24.

As illustratively shown in FIG. 6A, each of the active areas FF63 and FF64 extends along the Y direction. Along the Y direction, the cut regions DB61 and DB62 are positioned at opposite ends of the active area FF63, respectively, and are positioned at opposite ends of the active area FF64, respectively. Referring to FIG. 5B and FIG. 6A, configurations of the active areas FF63 and FF64 are similar with the configurations of the active areas GAA52 and GAA53. Therefore, some descriptions are not repeated for brevity.

As illustratively shown in FIG. 6A, the gate structures GP11 and GP12 are disposed on the active area FF63. The gate structures GP13 and GP14 are disposed on the active area FF64. Lengths of the active areas FF63 and FF64 are shorter than lengths of the active areas FF21, FF22, FF25 and FF26 along the Y direction. Each of first ends of active areas FF63 and FF64 is apart from each of first ends of the active areas FF21, FF22, FF25 and FF26 by a distance W51 along the Y direction. Each of second ends of active areas FF63 and FF64 is apart from each of second ends of the active areas FF21, FF22, FF25 and FF26 by the distance W51 along the Y direction.

Referring to FIG. 6A and FIG. 5A, in some embodiments, the switch structures SS51 and SS52 are implemented by the active area FF63 and the cut regions DB61, DB62. In such embodiments, the isolation structures ISS1 and ISS2 correspond to the cut regions DB61 and DB62, respectively. The gate structures GIS11 and GIS12 correspond to the control terminals of the switch structures SS51 and SS52, and are floated. The active area FF63 corresponds to the nodes N11 and N12.

Referring to FIG. 6A and FIG. 5A, in some embodiments, the switch structures SS51 and SS52 are implemented by the active area FF64 and the cut regions DB61, DB62. In such embodiments, the isolation structures ISS1 and ISS2 correspond to the cut regions DB61 and DB62, respectively. The gate structures GIS11 and GIS12 correspond to the control terminals of the switch structures SS51 and SS52, and are floated. The active area FF64 corresponds to the nodes N11 and N12.

Referring to FIG. 6A, FIG. 4A, FIG. 3B, FIG. 2A and FIG. 1C, in some alternative embodiments, for semiconductors 400A, 300B, 200A and 100C, each of the portions 100D, 200B and 300C is replaced by the portion 600A, to form structures corresponding to the memory cell 510A shown in FIG. 5A.

Figure 6B:
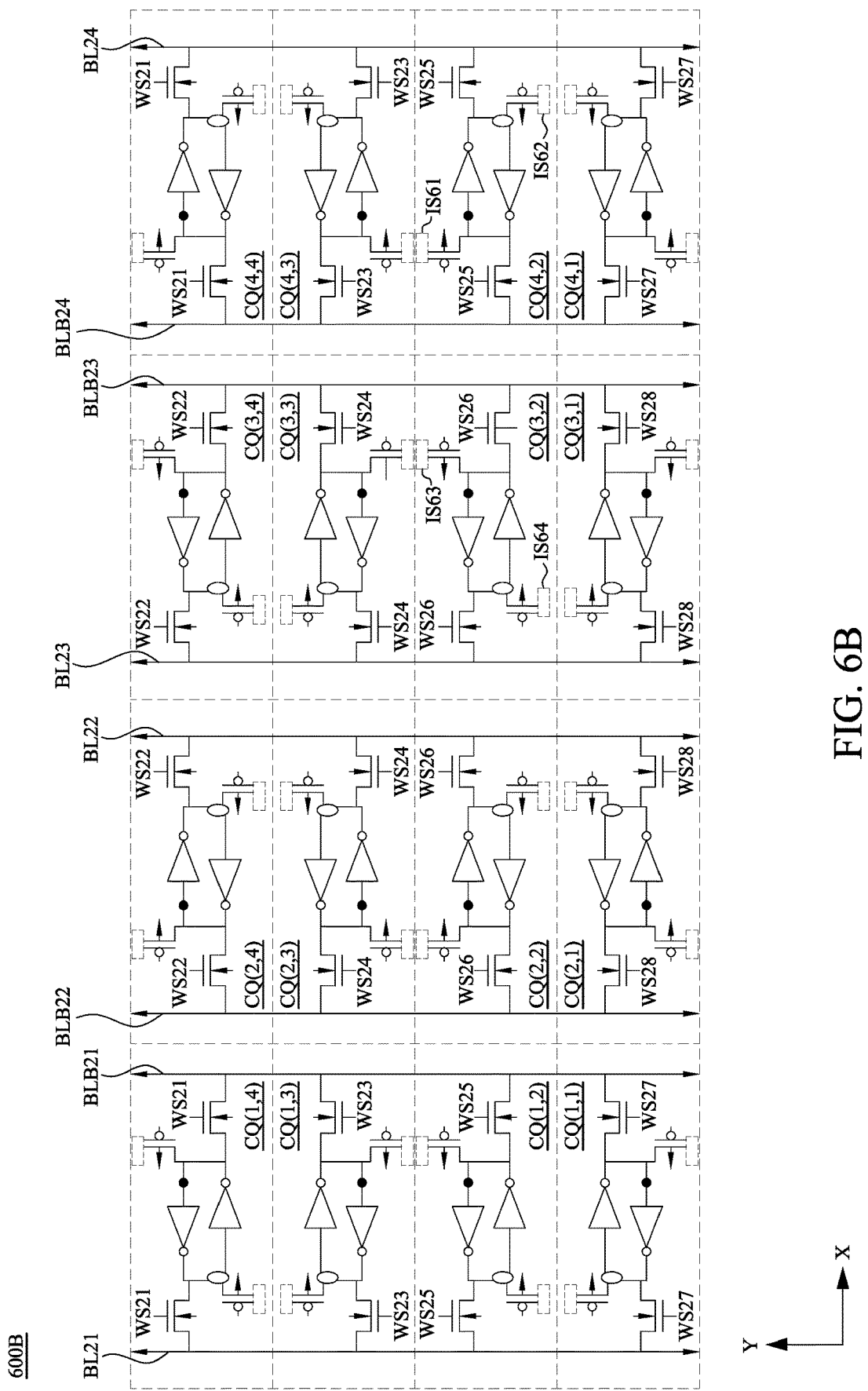
FIG. 6B is a circuit diagram of a semiconductor device corresponding to the semiconductor device shown in FIG. 2G, in accordance with some embodiments of the present disclosure.

FIG. 6B is a circuit diagram of a semiconductor device 600B corresponding to the semiconductor device 200G shown in FIG. 2G, in accordance with some embodiments of the present disclosure. As illustratively shown in FIG. 6B, the semiconductor device 600B includes memory cells CQ(1,1)-CQ(4,4). Referring to FIG. 4C and FIG. 2G, arrangements and connections with the word line signals WS21-WS28 and the bit lines BL21-BL24, BLB21-BLB24 of the memory cells CQ(1,1)-CQ(4,4) are similar with the arrangements and connections with the word line signals WS21-WS28 and the bit lines BL21-BL24, BLB21-BLB24 of the memory cells CL(1,1)-CL(4,4). Therefore, some descriptions are not repeated for brevity.

Referring to FIG. 6B and FIG. 5A, configurations of each of the memory cells CQ(1,1)-CQ(4,4) is similar with the memory cell 510A. For example, the memory cell CQ(4,2) includes isolation structures IS61 and IS62. The memory cell CQ(3,2) includes isolation structures IS63 and IS64. Each of the isolation structures IS61 and IS63 corresponds to the isolation structure ISS1, and each of the isolation structures IS62 and IS64 corresponds to the isolation structure ISS2.

Referring to FIG. 6B, FIG. 5B and FIG. 5C, adjacent two of the memory cells CQ(1,1)-CQ(4,4) are implemented by the memory cells 110C and 120C in some embodiments. For example, the memory cells CQ(3,2) and CQ(4,2) are implemented by the memory cells 110C and 120C, respectively.

In such example, the isolation structures IS61 and IS63 correspond to the cut region DG51, and the isolation structures IS62 and IS64 correspond to the cut region DG52. The cut region DG51 isolates the memory cell CQ(4,2) from the memory cell CQ(4,3) and isolates the memory cell CQ(3,2) from the memory cell CQ(3,3). The cut region DG52 isolates the memory cell CQ(4,2) from the memory cell CQ(4,1) and isolates the memory cell CQ(3,2) from the memory cell CQ(3,1).

Figure 7A:
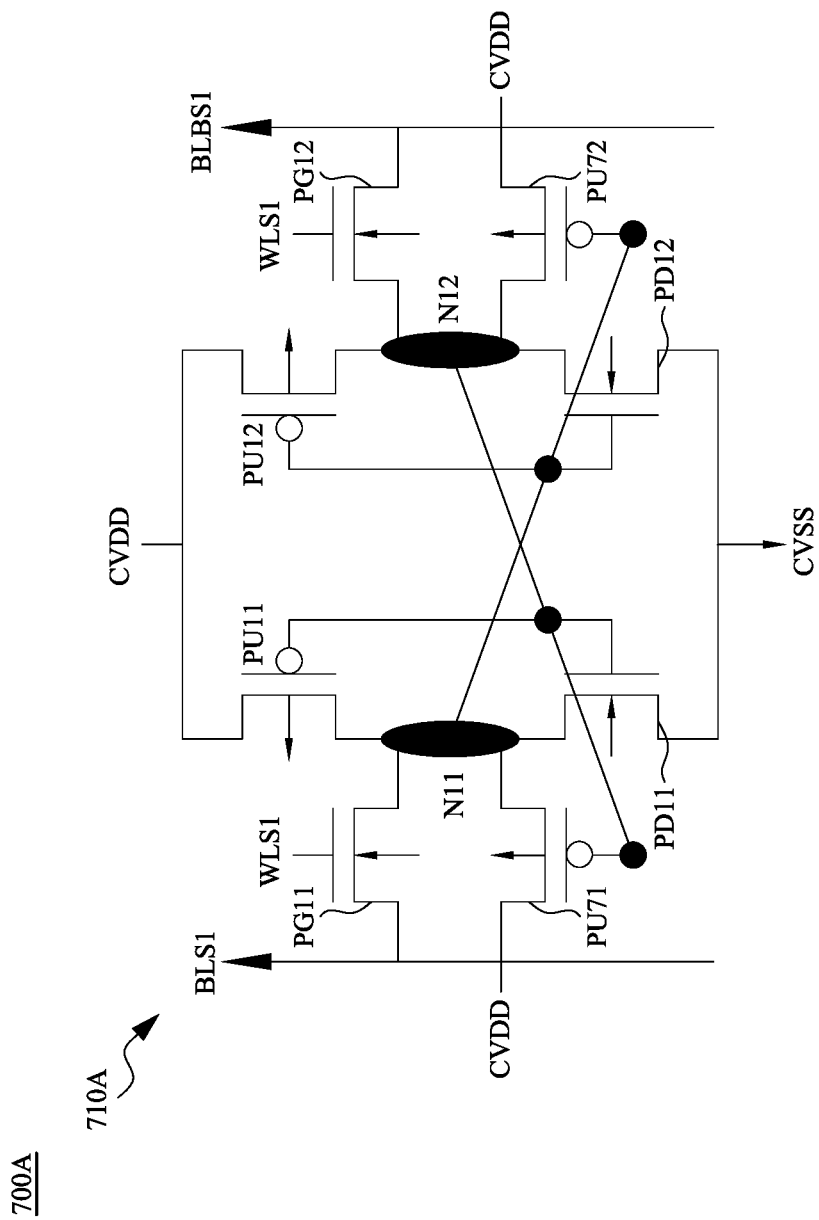
FIG. 7A is a circuit diagram of a memory cell corresponding to the memory cell shown in FIG. 1B, in accordance with some embodiments of the present disclosure.

FIG. 7A is a circuit diagram of a memory cell 700A corresponding to the memory cell 110A shown in FIG. 1B, in accordance with some embodiments of the present disclosure. As illustratively shown in FIG. 7A, semiconductor device 700A includes a memory cell 710A.

Referring to FIG. 7A and FIG. 1B, the semiconductor device 500A is an alternative embodiment of the memory cell 110A. FIG. 7A follows a similar labeling convention to that of FIG. 1B. For brevity, the discussion will focus more on differences between FIG. 7A and FIG. 1B than on similarities.

Referring to FIG. 7A and FIG. 1B, comparing with the memory cell 110A, the memory cell 710A includes switches PU71 and PU72 instead of the switches IS11 and IS12. A first terminal of switch PU71 is coupled to the node N11, a second terminal of the of switch PU71 is configured to receive the reference voltage signal CVDD, and a control terminal of switch PU71 is coupled to the node N12. A first terminal of switch PU72 is coupled to the node N12, a second terminal of the of switch PU72 is configured to receive the reference voltage signal CVDD, and a control terminal of switch PU72 is coupled to the node N11. The switch PU71 is coupled in parallel with the switch PU11. The switch PU72 is coupled in parallel with the switch PU12.

In some approaches, a memory cell only includes one switch for adjusting a data storage node by a reference voltage signal. As a result, a voltage level of the data storage node is not stable.

Compared to the above approaches, in some embodiments of the present disclosure, a voltage level of the node N11 is adjusted by the switches PU11 and PU71 by the reference voltage signal CVDD, and a voltage level of the node N12 is adjusted by the switches PU12 and PU72 by the reference voltage signal CVDD. Accordingly, the stability of the nodes N11 and N12 are improved.

Figure 7B:
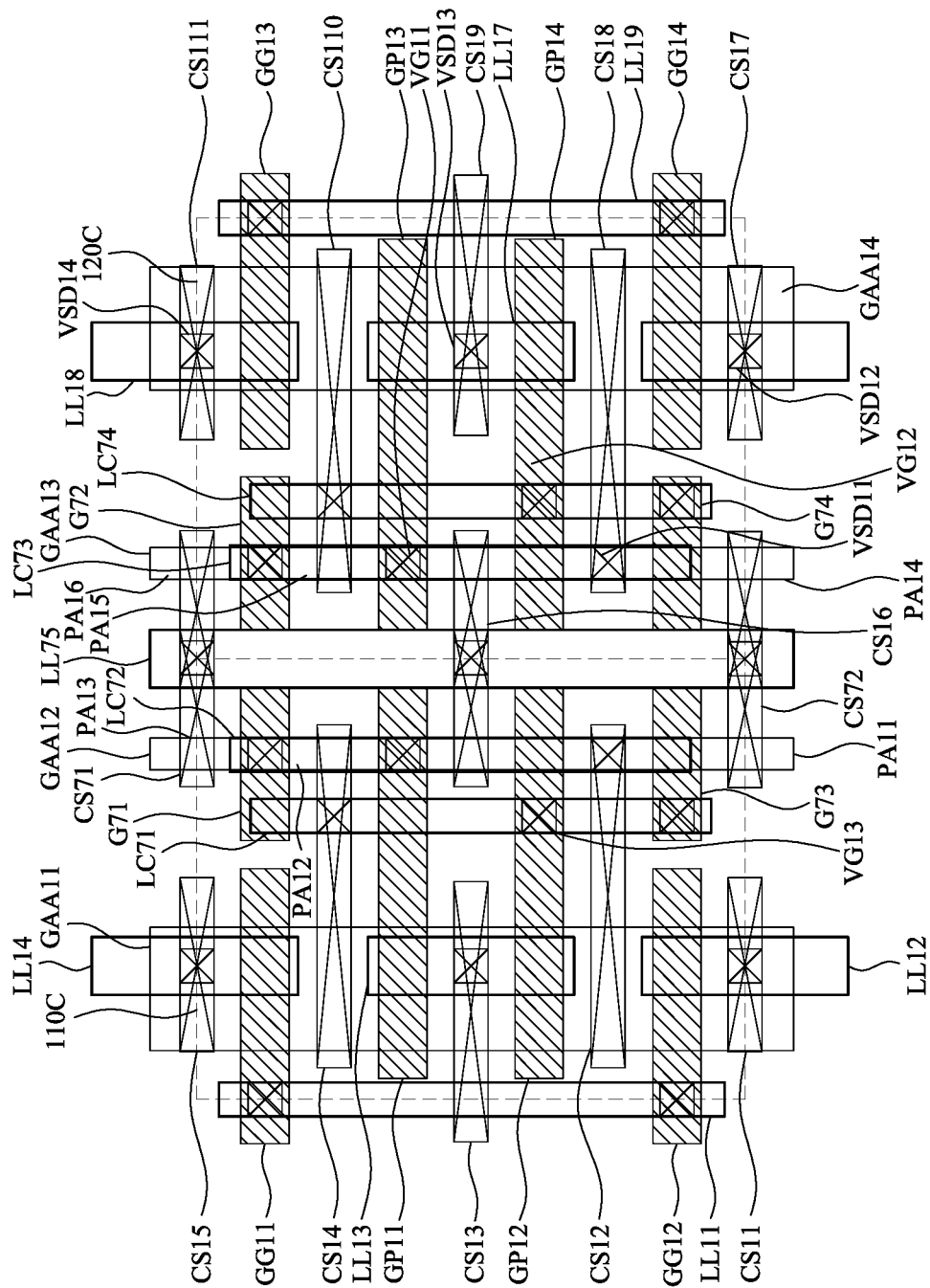
FIG. 7B is a layout diagram of a portion corresponding to the semiconductor device shown in FIG. 7A, in accordance with some embodiments of the present disclosure.

FIG. 7B is a layout diagram of a portion 700B corresponding to the semiconductor device 700A shown in FIG. 7A, in accordance with some embodiments of the present disclosure. Referring to FIG. 7B and FIG. 7A, at least one part of the semiconductor device 700A is implemented by the portion 700B. For example, the memory cell 710A is implemented by one of the memory cells 110C and 120C.

Referring to FIG. 7B and FIG. 1D, the portion 700B is an alternative embodiment of the portion 100D. FIG. 7B follows a similar labeling convention to that of FIG. 1D. For brevity, the discussion will focus more on differences between FIG. 7B and FIG. 1D than on similarities. Comparing with the portion 100D, the portion 700B includes a landing line LL75, local connections LC71-LC74, contact structures CS71, CS72 and gate structures G71-G72 instead of the landing line LL15, local connections LC11-LC14 and gate structures GIS11, GIS12.

As illustratively shown in FIG. 7B, the gate structures G71 and G72 are disposed between and aligned with the gate structures GG11 and GG13. The gate structures G73 and G74 are disposed between and aligned with the gate structures GG12 and GG14. The contact structure CS71 is disposed between and aligned with the contact structures CS15 and CS111. The contact structure CS72 is disposed between and aligned with the contact structures CS11 and CS17. The local connections LC71-LC74 are disposed between the landing lines LL13 and LL17, and are arranged in order along the X direction. The landing line LL75 is disposed between the local connections LC72 and LC73 and extends along the Y direction.

As illustratively shown in FIG. 7B, each of the gate structures G71 and G73 crosses over and contacts with the active area GAA12. Each of the gate structures G72 and G73 crosses over and contacts with the active area GAA13. Each of the contact structures CS71 and CS72 crosses over and contacts with the active areas GAA12 and GAA13. The local connection LC71 crosses over and contacts with the gate structure G73, GP12 and the contact structure CS14. The local connection LC72 crosses over and contacts with the gate structure G71, GP11 and the contact structure CS12. The local connection LC73 crosses over and contacts with the gate structure G72, GP13 and the contact structure CS18. The local connection LC74 crosses over and contacts with the gate structure G74, GP14 and the contact structure CS110. The landing line LL75 crosses over and contacts with the contact structures CS71, CS72 and CS16.

Referring to FIG. 7B and FIG. 7A, in some embodiments, the memory cell 710A is implemented by the memory cell 110C. In such embodiments, the gate terminals of the switches PU71 and PU72 correspond to the gate structures G71 and G73, respectively. The nodes N11 and N12 correspond to the local connections LC71 and LC72, respectively. The landing line LL75 is configured to transmit the reference voltage signal CVDD to the switches PU71 and PU72 through the contact structures CS71 and CS72.

Referring to FIG. 7B and FIG. 7A, in some embodiments, the memory cell 710A is implemented by the memory cell 120C. In such embodiments, the gate terminals of the switches PU71 and PU72 correspond to the gate structures G72 and G74, respectively. The nodes N11 and N12 correspond to the local connections LC74 and LC73, respectively. The landing line LL75 is configured to transmit the reference voltage signal CVDD to the switches PU71 and PU72 through the contact structures CS71 and CS72.

Referring to FIG. 7B, FIG. 4A, FIG. 3B, FIG. 2A and FIG. 1C, in some alternative embodiments, for semiconductors 400A, 300B, 200A and 100C, each of the portions 100D, 200B and 300C is replaced by the portion 700B, to form structures corresponding to the memory cell 710A shown in FIG. 7A.

Figure 7C:
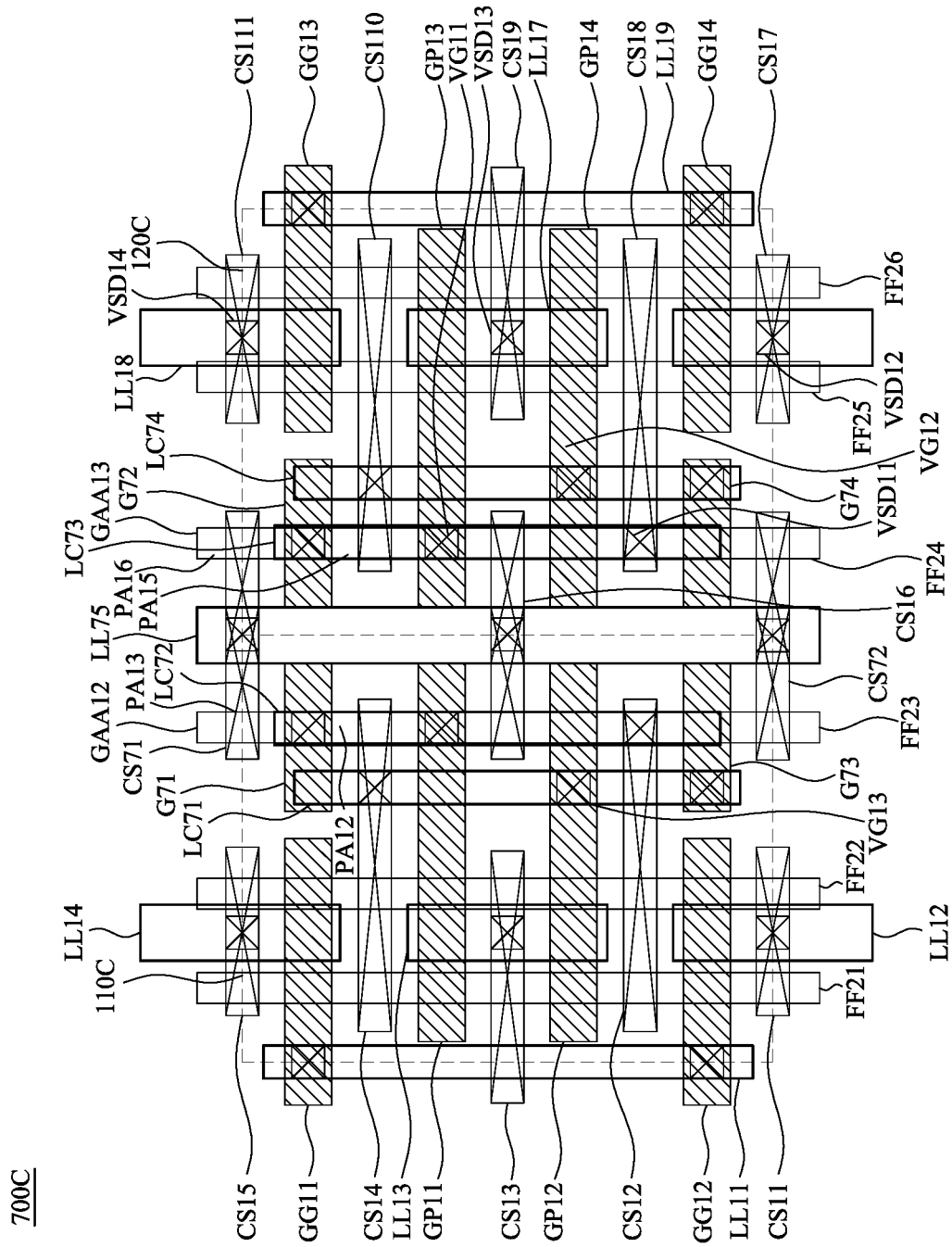
FIG. 7C is a layout diagram of a portion corresponding to the semiconductor device shown in FIG. 7A, in accordance with some embodiments of the present disclosure.

FIG. 7C is a layout diagram of a portion 700C corresponding to the semiconductor device 700A shown in FIG. 7A, in accordance with some embodiments of the present disclosure. Referring to FIG. 7B and FIG. 7A, at least one part of the semiconductor device 700A is implemented by the portion 700B. For example, the memory cell 710A is implemented by one of the memory cells 110C and 120C.

Referring to FIG. 7C and FIG. 7B, the portion 700C is an alternative embodiment of the portion 700B. FIG. 7C follows a similar labeling convention to that of FIG. 7B. For brevity, the discussion will focus more on differences between FIG. 7C and FIG. 7B than on similarities. Comparing with the portion 700B, the portion 700C includes the active areas FF21-FF26 instead of the active areas GAA11-GAA14. The difference between the active areas FF21-FF26 and the active areas GAA11-GAA14 are described above with the embodiments associated with the FIG. 1D and FIG. 2C. Therefore, some descriptions are not repeated for brevity.

Also disclosed is a semiconductor device. The semiconductor device includes a first memory cell. The first memory cell includes a first active area, a second active area, a first gate structure, a second gate structure, a first conductive segment, a second conductive segment and a third conductive segment. The first active area extends along a first direction. The second active area extends along the first direction. The first gate structure crosses over the first active area and the second active area. The second gate structure crosses over the first active area and the second active area. The first conductive segment crosses over the first gate structure and the second gate structure, is configured to store a first data signal, and is coupled to the first gate structure, the first active area and the second active area. The second conductive segment crosses over the first gate structure and the second gate structure, is configured to store a first complementary data signal, and is coupled to the second gate structure, the first active area and the second active area. The third conductive segment crosses over the first gate structure and the second gate structure, and is coupled to the second active area. The first conductive segment, the second conductive segment and the third conductive segment are arranged in order along a second direction different from the first direction. The first data signal and the first complementary data signal are complementary with each other.

Also disclosed is a method. The method includes: forming a first active region on a well; forming a first gate structure and a second gate structure on a first portion of the first active region; forming a first isolation structure interposed into the first active region and the well, to isolate the first portion from a second portion of the first active region; and forming a second isolation structure interposed into the first active region and the well, to isolate the first portion from a third portion of the first active region. The first gate structure is coupled to a first node storing a first data signal. The second gate structure is coupled to a second node storing a first complementary data signal which is complementary with the first data signal.

Also disclosed is a semiconductor device. The semiconductor device includes a first memory cell storing a data signal at a first node and storing a complementary data signal at a second node. The first memory cell includes a first switch, a second switch and a third switch. A control terminal of the first switch is coupled to the second node, a first terminal of the first switch is configured to receive a reference voltage signal, and a second terminal of the first switch is coupled to the first node. The second switch is different from the first switch. A control terminal of the second switch is coupled to the second node, a first terminal of the second switch is configured to receive the reference voltage signal, and a second terminal of the second switch is coupled to the first node. A control terminal of the third switch is coupled to the first node, a first terminal of the third switch is configured to receive the reference voltage signal, and a second terminal of the third switch is coupled to the second node.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising a first memory cell, the first memory cell comprising:
   a first active area extending along a first direction;
   a second active area extending along the first direction, wherein:
      the first active area is shorter than the second active area by at least a first distance along the first direction, and
      along the first direction, a first end of the first active area is apart from a first end of the second active area by the first distance, and a second end of the first active area is apart from a second end of the second active area by the first distance;
   a first gate structure crossing over the first active area and the second active area;
   a second gate structure crossing over the first active area and the second active area, wherein the first gate structure and the second gate structure are separated from each other along the first direction by the first distance;
   a first conductive segment crossing over the first gate structure and the second gate structure, configured to store a first data signal, and coupled to the first gate structure, the first active area and the second active area;
   a second conductive segment crossing over the first gate structure and the second gate structure, configured to store a first complementary data signal, and coupled to the second gate structure, the first active area and the second active area; and
   a third conductive segment crossing over the first gate structure and the second gate structure, and coupled to the second active area, wherein:
      the first conductive segment, the second conductive segment and the third conductive segment are arranged in order along a second direction different from the first direction, and
      the first data signal and the first complementary data signal are complementary with each other.

2. The semiconductor device of claim 1, wherein the first memory cell further comprises:
   a fourth conductive segment configured to transmit the first data signal to the second active area; and
   a fifth conductive segment configured to transmit the first complementary data signal to the second active area,
   wherein the third conductive segment, the fourth conductive segment and the fifth conductive segment are aligned with each other along the first direction.

3. The semiconductor device of claim 1, further comprising a second memory cell, the second memory cell comprising:
   a third active area extending along the first direction;
   a fourth active area extending along the first direction;
   a third gate structure crossing over the third active area and the fourth active area;
   a fourth gate structure crossing over the third active area and the fourth active area;
   a fourth conductive segment crossing over the third gate structure and the fourth gate structure, configured to store a second data signal, and coupled to the third gate structure, the third active area and the fourth active area;
   a fifth conductive segment crossing over the third gate structure and the fourth gate structure, configured to store a second complementary data signal, and coupled to the fourth gate structure, the third active area and the fourth active area; and
   a sixth conductive segment crossing over and coupled to the third gate structure and the fourth gate structure, wherein:
      the sixth conductive segment, the fifth conductive segment, the fourth conductive segment and the first conductive segment are arranged in order along the second direction, and
      the second data signal and the second complementary data signal are complementary with each other.

4. The semiconductor device of claim 1, further comprising:
   a first isolation structure extending along the second direction, interposed into the first active area and a well under the first active area, to isolate a first portion of the first active area from a second portion of the first active area,
   wherein each of the first gate structure and the second gate structure crosses over the second portion of the first active area.

5. The semiconductor device of claim 1, further comprising:
   a third gate structure crossing over and contacting with the first active area;
   a first contact structure crossing over the second active area, and configured to receive a reference voltage signal; and
   a second contact structure crossing over the first active area, and configured to receive the reference voltage signal,
   wherein the second gate structure, the second contact structure, the first gate structure and the third gate structure are arranged in order along the first direction.

6. The semiconductor device of claim 5, further comprising:
   a fourth gate structure crossing over and contacting with the first active area.

7. The semiconductor device of claim 1, further comprising:
   a third gate structure extending along the second direction, crossing over and contacting with the first active area, and configured to isolate a first portion of the first active area from a second portion of the first active area,
   wherein each of the first gate structure and the second gate structure crosses over the second portion of the first active area.

8. The semiconductor device of claim 7, further comprising:
   a fourth gate structure extending along the second direction, crossing over and contacting with the first active area, and configured to isolate a third portion of the first active area from the second portion of the first active area, wherein:
      the third portion, the second portion and the first portion are arranged in order, and
      each of the third gate structure and the fourth gate structure is configured to receive a reference voltage signal.

9. The semiconductor device of claim 7, further comprising a second memory cell, the second memory cell comprising:
 a third active area extending along the first direction and configured to operate as source/drain terminals of at least one transistor of the second memory cell,
 wherein the third gate structure crosses over and contacts with the third active area, and is configured isolate two portions of the third active area from each other.

10. A semiconductor device, comprising a first memory cell, the first memory cell comprising:
 a first active region on a well;
 a first gate structure and a second gate structure on a first portion of the first active region;
 a first isolation structure interposed into the first active region and the well, to isolate the first portion from a second portion of the first active region; and
 a second isolation structure interposed into the first active region and the well, to isolate the first portion from a third portion of the first active region, wherein:
  the first gate structure is coupled to a first node storing a first data signal,
   the second gate structure is coupled to a second node storing a first complementary data signal which is complementary with the first data signal, and
   a width of the first isolation structure is approximately equal to a width of the first gate structure.

11. The semiconductor device of claim 10, wherein a distance between the first isolation structure the second gate structure is approximately equal to a distance between of the first gate structure the second gate structure.

12. The semiconductor device of claim 10, further comprising:
 a dummy gate structure which is floated between the first isolation structure and the second gate structure.

13. The semiconductor device of claim 10, wherein the first isolation structure extends through a portion of the well from a top surface of the well.

14. The semiconductor device of claim 10, further comprising:
 a second active region extending parallel to the first active region.

15. The semiconductor device of claim 14, wherein the first isolation structure is interposed into the second active region.

16. The semiconductor device of claim 15, wherein the second isolation structure is interposed into the second active region.

17. A semiconductor device, comprising a first memory cell, the first memory cell comprising:
 a first active region on a well;
 a first gate structure and a second gate structure on a first portion of the first active region;
 a first isolation structure interposed into the first active region and the well, to isolate the first portion from a second portion of the first active region;
 a second isolation structure interposed into the first active region and the well, to isolate the first portion from a third portion of the first active region, wherein:
  the first gate structure is coupled to a first node storing a first data signal, and
  the second gate structure is coupled to a second node storing a first complementary data signal which is complementary with the first data signal; and
 a dummy gate structure which is floated between the first isolation structure and the second gate structure.

18. The semiconductor device of claim 17, wherein a distance between the first isolation structure the second gate structure is approximately equal to a distance between of the first gate structure the second gate structure.

19. The semiconductor device of claim 17, further comprising:
 a second active region, wherein the first isolation structure is interposed into the second active region.

20. The semiconductor device of claim 19, further comprising:
 a contact structure overlying the first active region and the second active region.

* * * * *